United States Patent
Gentieu et al.

(10) Patent No.: US 6,880,070 B2
(45) Date of Patent: Apr. 12, 2005

(54) SYNCHRONOUS NETWORK TRAFFIC PROCESSOR

(75) Inventors: Paul R. Gentieu, Sunnyvale, CA (US); Tom Acquistapace, Martinez, CA (US); Farhad Iryami, Millbrae, CA (US)

(73) Assignee: Finisar Corporation, Sunnyvale, CA (US)

( * ) Notice: Subject to any disclaimer, the term of this patent is extended or adjusted under 35 U.S.C. 154(b) by 352 days.

(21) Appl. No.: 09/976,765

(22) Filed: Oct. 12, 2001

(65) Prior Publication Data

US 2002/0126705 A1 Sep. 12, 2002

Related U.S. Application Data

(60) Provisional application No. 60/254,436, filed on Dec. 8, 2000.

(51) Int. Cl.[7] .............................................. G08F 13/00
(52) U.S. Cl. ...................................................... 712/228
(58) Field of Search ........................................ 712/228

(56) References Cited

U.S. PATENT DOCUMENTS

| | | | |
|---|---|---|---|
| 5,241,635 A | 8/1993 | Papadopoulos et al. ..... 712/201 |
| 5,530,703 A | 6/1996 | Liu et al. ..................... 370/255 |
| 5,550,816 A | * 8/1996 | Hardwick et al. .......... 370/397 |
| 5,566,170 A | * 10/1996 | Bakke et al. ................ 370/392 |
| 5,598,410 A | * 1/1997 | Stone .......................... 370/469 |
| 5,710,908 A | 1/1998 | Man ............................ 709/230 |
| 5,864,679 A | 1/1999 | Kanai et al. ................. 709/238 |
| 6,021,419 A | 2/2000 | Clarke, Jr. et al. .......... 708/300 |
| 6,084,887 A | 7/2000 | Salisbury et al. ........... 370/467 |
| 6,157,641 A | * 12/2000 | Wilford ...................... 370/389 |

FOREIGN PATENT DOCUMENTS

WO    PCT/US01/46902    12/2001

* cited by examiner

Primary Examiner—Eric Coleman
(74) Attorney, Agent, or Firm—Workman Nydegger

(57) ABSTRACT

A synchronous network traffic processor that synchronously processes, analyzes and generates data for high-speed network protocols, on a wire-speed, word-by-word basis. The synchronous network processor is protocol independent and may be programmed to convert protocols on the fly. An embodiment of the synchronous network processor described has a low gate count and can be easily implemented using programmable logic. An appropriately programmed synchronous network traffic processor may replace modules traditionally implemented with hard-wired logic or ASIC.

36 Claims, 9 Drawing Sheets

SYNCHRONOUS NETWORK TRAFFIC PROCESSOR

The present application claims priority to U.S. Provisional Patent Application entitled "SYNCHRONOUS NETWORK TRAFFIC PROCESSOR", filed Dec. 8, 2000, and bearing Ser. No. 60/254,436.

FIELD OF THE INVENTION

The present invention relates generally to data processors for high speed communication systems and networks. More particularly, the present invention relates to processors for real-time analysis and processing of network data.

BACKGROUND OF THE INVENTION

Network communication devices are, in general, protocol dependent. Since devices which communicate within computer and storage Networks must strictly adhere to rapidly changing protocols associated with those networks, it has become clear that the use of protocol independent-network processors to analyze, generate and process traffic within these networks is of extreme practical and business importance.

As such, network communication devices typically include specially designed protocol-specific state machines and decoder logic. Protocol-specific hardware offers the advantages of high performance and cost-effectiveness. However, high-speed networking protocol standards are in a state of flux—new protocols are emerging and changing all the time. Since protocol-specific hardware designs are not reusable for different protocols, major redesigning efforts are expended in producing protocol-specific hardware for these emerging protocols. Furthermore, protocol-specific hardware designs cannot be easily upgraded to include new features and functionality. In most cases, modifications to the hardware itself must be made.

SUMMARY OF THE INVENTION

An embodiment of the present invention includes a network traffic processor. The processor itself is protocol independent; it does not have any hardwired logic for recognizing packets, frames, or any other protocol-specific entities. Framing-based tasks are performed inside the processor using user-defined software instructions. Thus, the same processor may be used to implement network data processing systems for virtually any protocol. Furthermore, new features and functionality can be easily added to the network traffic processor through software upgrades. As a result, the development cost of network data processing systems, as well as the cost of upgrading the system, can also be greatly reduced.

The network traffic processor of the present invention is capable of synchronously processing and generating data for high-speed protocols (serial or otherwise), on a wire-speed, word-by-word basis. Significantly, the processor is capable of operating data directly on its input/output busses without requiring the data to be moved in and out of registers or internal memory units. The low overhead of operating on data directly on its input/output busses, minimizes the total clock cycles required to process and generate each I/O data word. The network processor receives and transmits data on every clock, and executes instructions upon the same clock, eliminating the need for polling or interrupts to determine whether data is ready to be read or written.

According to an embodiment of the present invention, multiple synchronous network traffic processors may be implemented in a system, in a chain mode or otherwise, for providing a multitude of programmable functions. The synchronous network traffic processor may also be integrated with other hardware functions, such as other types of processors, memory controllers, FIFOs, etc.

The synchronous network traffic processor, in one embodiment, has a low gate count and can be easily implemented using programmable logic (e.g., FPGA). An appropriately programmed synchronous network traffic processor may replace modules traditionally implemented with hard-wired logic or ASIC.

BRIEF DESCRIPTION OF THE DRAWINGS

Additional features of the invention will be more readily apparent from the following detailed description and appended claims when taken in conjunction with the drawings, in which:

DESCRIPTION OF THE PREFERRED EMBODIMENTS

The present invention provides a processor for synchronously processing and generating data for high speed serial protocols on a word-by-word basis. In contrast to conventional microprocessors, whose main focus is on register and memory operations, an emphasis of the present invention is I/O processing. The processor of the present invention is capable of operating directly on the data streams in its I/O busses without requiring the data to be moved in and out of registers or internal memory. In addition, the processor of the present invention has a wide instruction set. These factors reduce the total clock cycles required to process and optionally modify each I/O data word. Indeed, in one embodiment of the present invention, a data word may be processed and modified in a single instruction clock cycle.

Significantly, the processor of the present invention executes instructions synchronously with a master clock that drives the I/O busses. In one embodiment, the processor interfaces directly to the inbound serial-parallel and outbound parallel-serial converters of the receive and transmit serial interfaces. Words are received and transmitted on every clock cycle, eliminating the need for polling or interrupts to determine whether data is ready to be read or written. The processor does not have any hardwired logic for recognizing packets, frames, or any other asynchronously-arriving protocol-specific entities. The emphasis is on individual words, which arrive synchronously with instruction execution. Any framing functionality is performed by software. Thus, the processor may be programmed to handle any network protocol.

Figure 1:
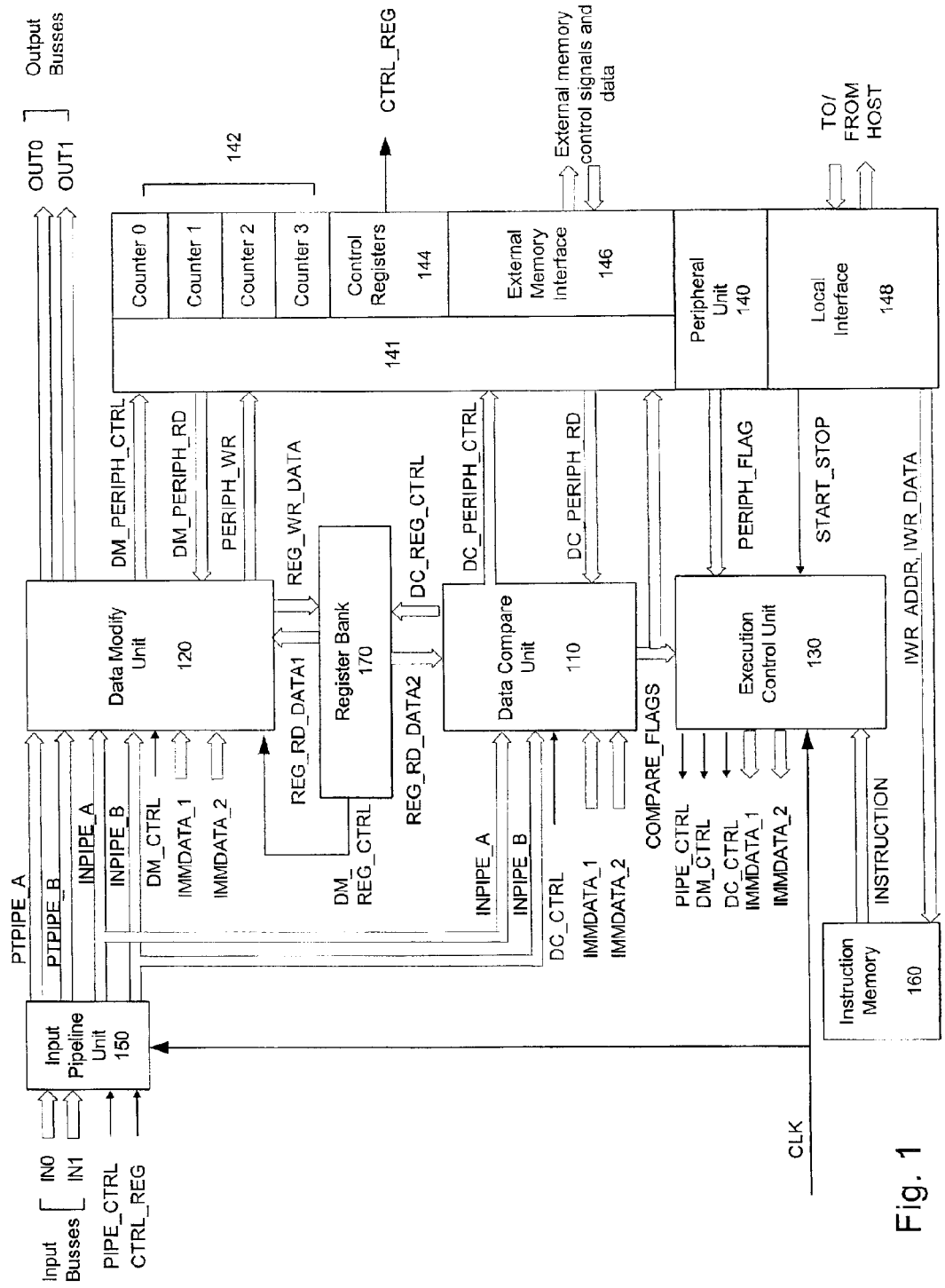
FIG. 1 is a block diagram illustrating the main functional units of a synchronous network data processor in accordance with an embodiment of the present invention.

FIG. 1 is a block diagram illustrating the main functional units of a synchronous network data processor 100 in accordance with an embodiment of the present invention. As illustrated, the synchronous network data processor 100 includes a data compare unit 110, a data modify unit 120, an execution control unit 130, a peripheral unit 140, an input pipeline unit 150, an instruction memory 160, and a bank of general-purpose registers 170. The peripheral unit 140 of the illustrated embodiment includes control signal decoders 141, counters 142, control registers 144, an external memory interface 146, and a local interface 148. In the preferred embodiment, instruction memory 160 is a 128-word instruction memory, and register bank 170 includes sixteen banks of 40-bit registers. Data are communicated between the main functional units via 40-bit wide data paths, corresponding to four ten-bit undecoded input characters and four eight-bit decoded characters plus control or status bits. Forty-bit wide data paths illustrated in FIG. 1 include: PTPIPE_A, PTPIPE_B, INPIPE_A, INPIPE_B, IMMDATA_1, IMMDATA_2, REG_RD_DATA1, REG_RD_DATA2, PERIPH_WR, DM_PERIPH_RD, DC_PERIPH_RD, and REG_WR_DATA. Also illustrated are address busses and control signal paths such as PIPE_CTRL, CTRL_REG, DM_CTRL, DC_CTRL, INSTRUCTION, COMPARE_FLAGS, PERIPH_FLAG, START_STOP, IWR_ADDR, IWR_DATA, DM_PERIPH_CTRL, DM_REG_CTRL, DC_PERIPH_CTRL, and DC_REG_CTRL. For simplicity, some addresses busses and control signals are omitted in FIG. 1.

The input pipeline unit 150, in the present embodiment, includes four 40-bit wide by 16-stage pipeline registers for the input busses. Two of these pipelines (INPIPE_A, INPIPE_B) feed data from input bus IN0 and IN1 to the data compare unit 110 and data modify unit 120; the other two pipelines (PTPIPE_A, PTPIPE_B) are used for automatic pass-through of data from the input busses IN0 and IN1 to output busses OUT0 and OUT1 without program intervention. The input pipeline unit 150 is driven by an externally generated clock signal CLK. Particularly, each pipeline of the input pipeline unit 150 is operable for receiving/outputting one word during one cycle of the clock signal CLK. The pipeline stages from which the outputs are taken are selectable by control signals PIPE_CTRL and CTRL_REG. The signal PIPE_CTRL is generated by the execution control unit 130 based on a currently executed instruction. The control signal CTRL_REG is generated by the control registers 144 based on the values stored therein by the execution control unit 130 in previous execution cycles.

In the present embodiment, the execution control unit 130 executes one instruction at every instruction cycle. Instructions are fetched and executed from the internal instruction memory 160. Any results the instruction generates may be used in the following instruction. Instruction execution may be interrupted by a trap, which can be generated either internally or from the external interrupt pins. Traps transfer control either to a fixed address or a relative offset from the current program counter (PC); the trap address, absolute/relative mode, and condition are all software-programmable. Every instruction may execute conditionally. Further, every instruction may specify up to two different conditional relative branches, each with its own destination address. Conditional execution control fields are shared with the control fields for the second branch. Therefore, if conditional execution is used the second branch must be disabled or use the same condition.

The processor 100 can execute two types of instructions: data compare instructions and data modify instructions. Data compare instructions are for generating control signals that control the data compare unit 110; data modify instructions are for generating control signals that control the data modify unit 120.

Significantly, the execution control unit 130 is synchronous with the input pipeline unit 150. That is, both the execution control unit 130 and the input pipeline unit 150 are driven by the same externally generated clock signal CLK. During each cycle of the clock signal CLK, one data word is received by each pipeline of the input pipeline unit 150 and one instruction is executed by the execution control unit 130. This is significantly different from conventional microprocessors where data is required to be moved in and out of registers or internal memory and where the instruction clock is not synchronous with the I/O clock.

With reference still to FIG. 1, the data compare unit 110 is operable for selectively performing mask/match comparisons of two instruction-specified operands during each instruction cycle. In the present embodiment, the instruction-specified operands may come from the input pipeline unit 150 (via INPIPE_A, INPIPE_B), the register bank 170 (via REG_RD_DATA2), peripheral units 140 (via DM_PERIPH_RD), and the execution control unit 130 (via IMMDATA_1, IMMDATA_2). The mask/match and compare operations performed by the data compare unit 110 are instruction-specified. In particular, the mask/match and compare operations performed are specified by the control signal DC_CTRL, which is generated by the execution control unit 130 based on the currently executed instruction. The data compare unit 110 stores the results of the mask/match comparisons to a set of compare flags, which are provided to the execution control unit 130 and peripheral unit 140 (via COMPARE_FLAGS). The set of compare flags may be used by the execution control unit 130 and the peripheral unit 140 in the next instruction cycle to conditionally branch, execute, trap, increment a counter, etc. In the present embodiment, there is one compare flag for each 8-bit byte of the 40 bit input word, allowing multiple independent byte comparisons as well as whole 40-bit word comparisons in one instruction. Also illustrated in FIG. 1 are the DC_REG_CTRL and the DC_PERIPH_CTRL signal paths that communicate addresses and commands from the data compare unit 110 to the register bank 170 and the peripheral unit 140, respectively.

The data modify unit 120 of the present embodiment includes arithmetic logic units (ALUs) operable for performing arithmetic and logic operations using instruction-specified operands and operators. In the present embodiment, instruction-specified operands and operators may come from the input pipeline unit 150 (via INPIPE_A, INPIPE_B), the register bank 170 (via REG_RD_DATA1), peripheral units 140 (DM_PERIPH_RD), and the execution control unit 130 (via IMMDATA_1, IMMDATA_2). Using the instruction-specified operands and operators, the data modify unit 120 generates output data words that are provided to the output busses OUT0 and OUT1, the register bank 170 (via REG_WR_DATA), and/or the peripheral units 140 (via PERIPH_WR). The data modify unit 120 also allows instruction-specified data to pass through unaltered to the output busses OUT0 and OUT1. The modification operations performed by the data modify unit 120 are instruction-specified. In particular, the data modifications performed by the data modify unit 120 are specified by the control signal DM_CTRL, which is generated by the execution control unit 130 according to the currently executed instruction. Also illustrated are the DM_REG_CTRL and the DM_PERIPH_CTRL signal paths that communicate addresses and commands from the data modify unit 120 to the register bank 170 and peripheral unit 140, respectively.

With reference still to FIG. 1, the peripheral unit 140 includes four 20-bit counters 142, control registers 144, an external memory/peripheral interface 146, and a local interface 148. The local interface 148 allows a host computer to download instructions to the instruction memory 160 via IWR_ADDR and IWR_DATA busses, and to control the operations of the processor 100 via START_STOP signals and PERIPH_FLAGS. In addition, the control register 144 generates the CTRL_REG signal for controlling the operations of the pass-through pipes of the input pipeline unit 150. The local interface 148 also allows the host computer to communicate with the processor 100 via shared mailbox registers (not shown). Counters 142 that maybe cascaded to give two 40-bit counters or one 40-bit and two 20-bit counters. Each counter 142 has an independently programmable increment enable, allowing it to increment in different modes: synchronously at every clock cycle, selectively when a register is written, or based on a mask/match of the compare flags generated by the data compare unit 110. Additionally, one or two counters 142 may be used as an address generator for the external memory/peripheral interface 146. The data modify unit 120 may configure the counters 142 and the control registers 144 by communicating appropriate data via the PERIPH_WR bus.

An Exemplary Implementation of the Input Pipeline Unit

Figure 2A:
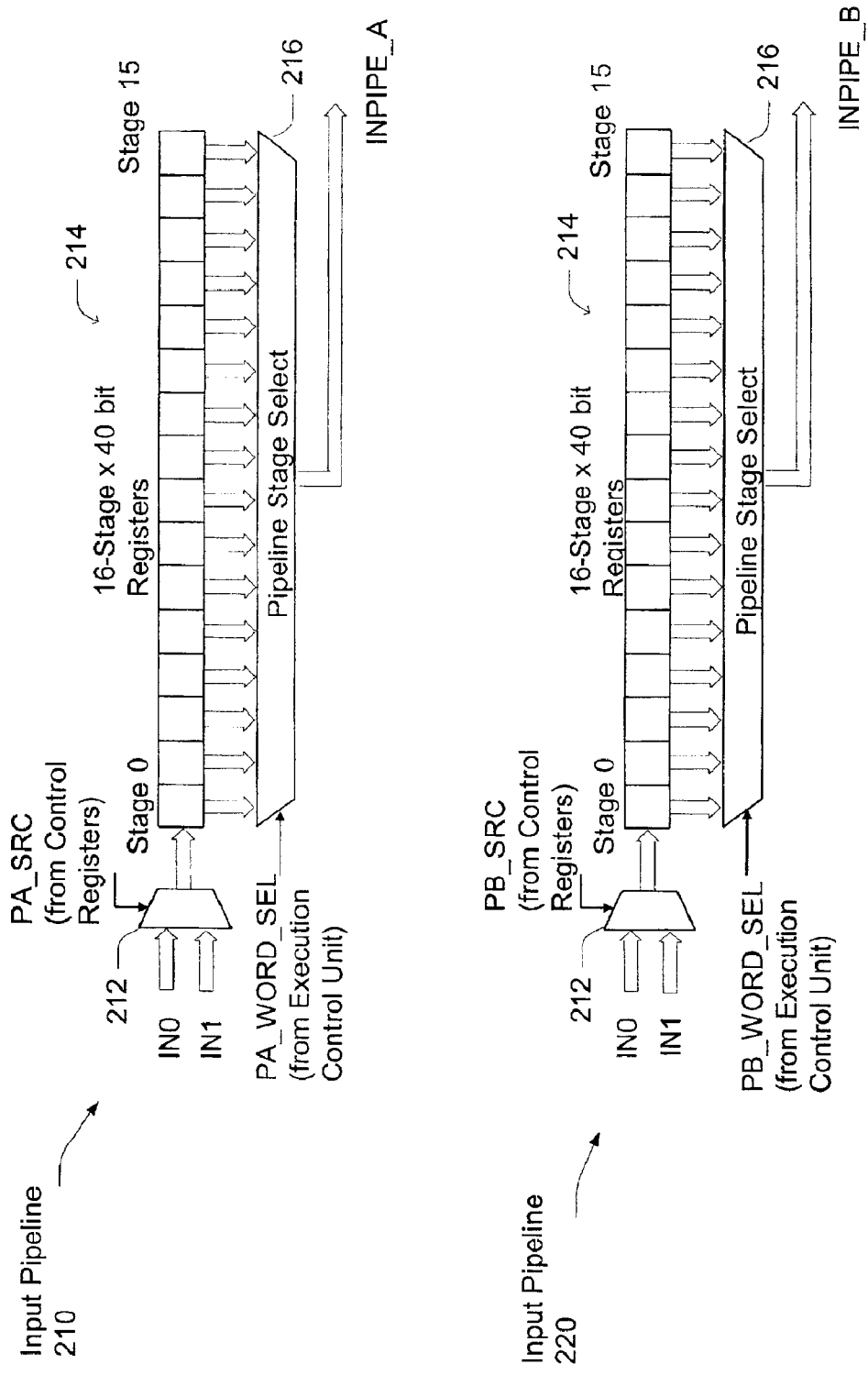
FIG. 2A is a block diagram illustrating an exemplary implementation of two input pipelines of the input pipeline unit in accordance with one embodiment of the invention.
Figure 2B:
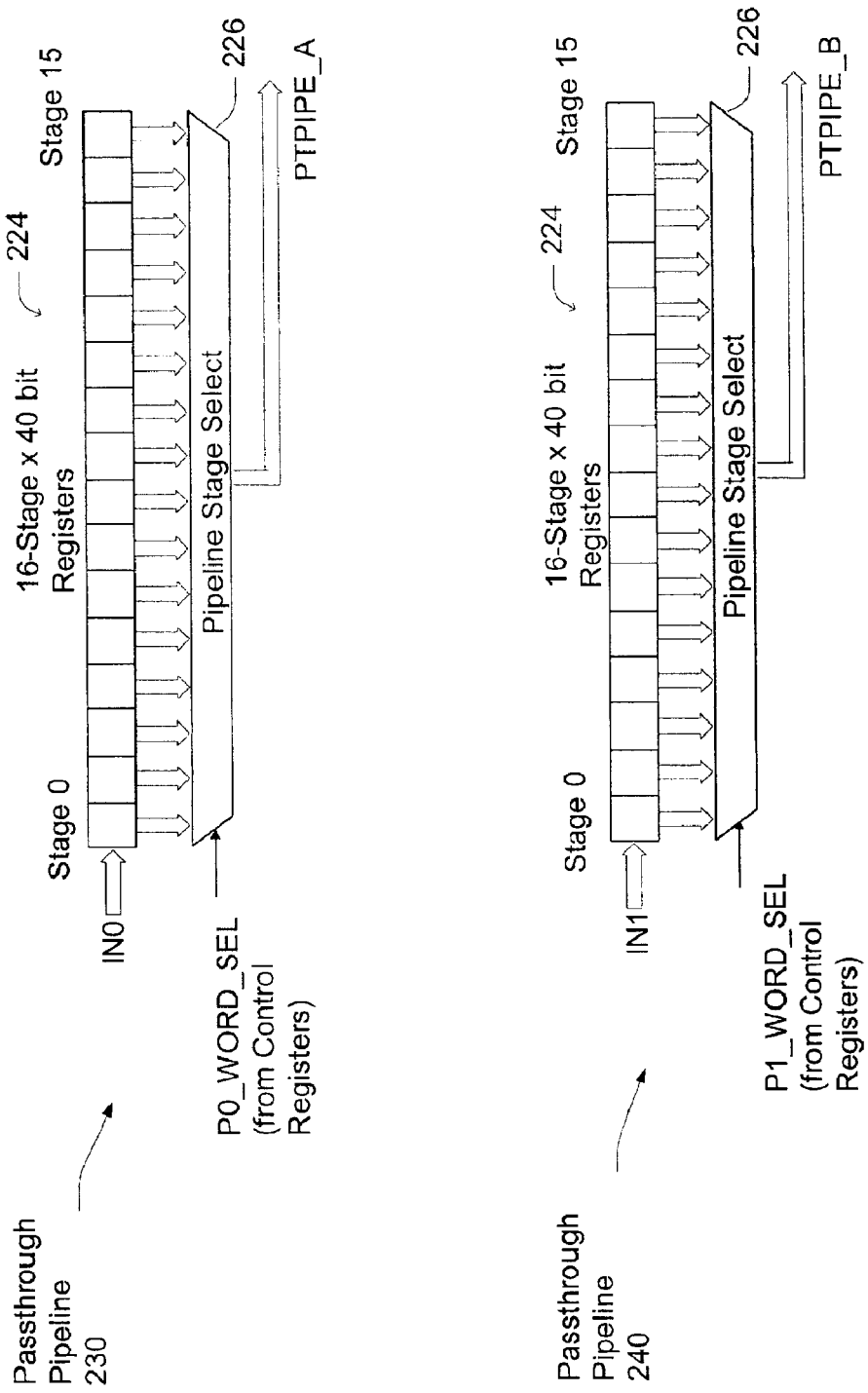
FIG. 2B is a block diagram illustrating an exemplary implementation of two pass-through pipelines of the input pipeline unit in accordance with one embodiment of the invention.

An exemplary implementation of the input pipeline unit 150 according to one embodiment of invention is illustrated in FIGS. 2A and 2B. FIG. 2A illustrates two input pipelines 210 and 220, and FIG. 2B illustrates two pass-through pipelines 230 and 240. Pipelines 210, 220, 230 and 240 each includes sixteen 40-bit wide registers 214 (herein called 16-stage pipeline registers) that are driven by the clock signal CLK.

As illustrated in FIG. 2A, input pipeline 210 includes a multiplexer 212 that selectively provides data from either one of the input busses IN0 and IN1 to the 40-bit wide by 16-stage pipeline registers 214 according to a control signal PA_SRC provided by the control registers 144 of the peripheral unit 140. Likewise, input pipeline 220 includes a multiplexer 212 that selectively provides data from either one of the input busses IN0 and IN1 to the pipeline registers 214 according to a control signal PB_SRC, which is also provided by the control registers 144.

In the illustrated embodiment, each stage of the pipeline registers 214 includes an output for outputting one of the input data words after a delay of a number of clock cycles corresponding to a position of the respective stage in the pipeline. The outputs of the pipelines 210 and 220 are determined by the pipeline stage select multiplexers 216, which select the stages from which the outputs are taken. The particular stages of the pipelines 210 and 220 from which the outputs are selected are controlled by control signals PA_WORD_SEL and PB_WORD_SEL, which are generated by the execution control unit 130 in accordance with the currently executed instruction.

Pass-through pipelines 230 and 240 of FIG. 2B are used for automatic pass-through of unmodified data from the input busses IN0 and IN1 to the output busses OUT0 and OUT1 without program intervention. Similar to pipelines 210 and 220, each stage of the pipeline registers 214 includes an output for outputting one of the input data words after a delay of a number of instructions cycles corresponding to a position of the respective stage in the pipeline. The outputs of the pipelines 230 and 240 are determined by the pipeline stage select multiplexers 226, which select the stages from which the outputs are taken. The particular stages of the pipelines 230 and 240 from which the outputs are selected are controlled by control signals P0_WORD_SEL and P1_WORD_SEL, which are provided by the control registers 144 of the peripheral unit 140.

An Exemplary Implementation of the Data Compare Unit

Figure 3A:
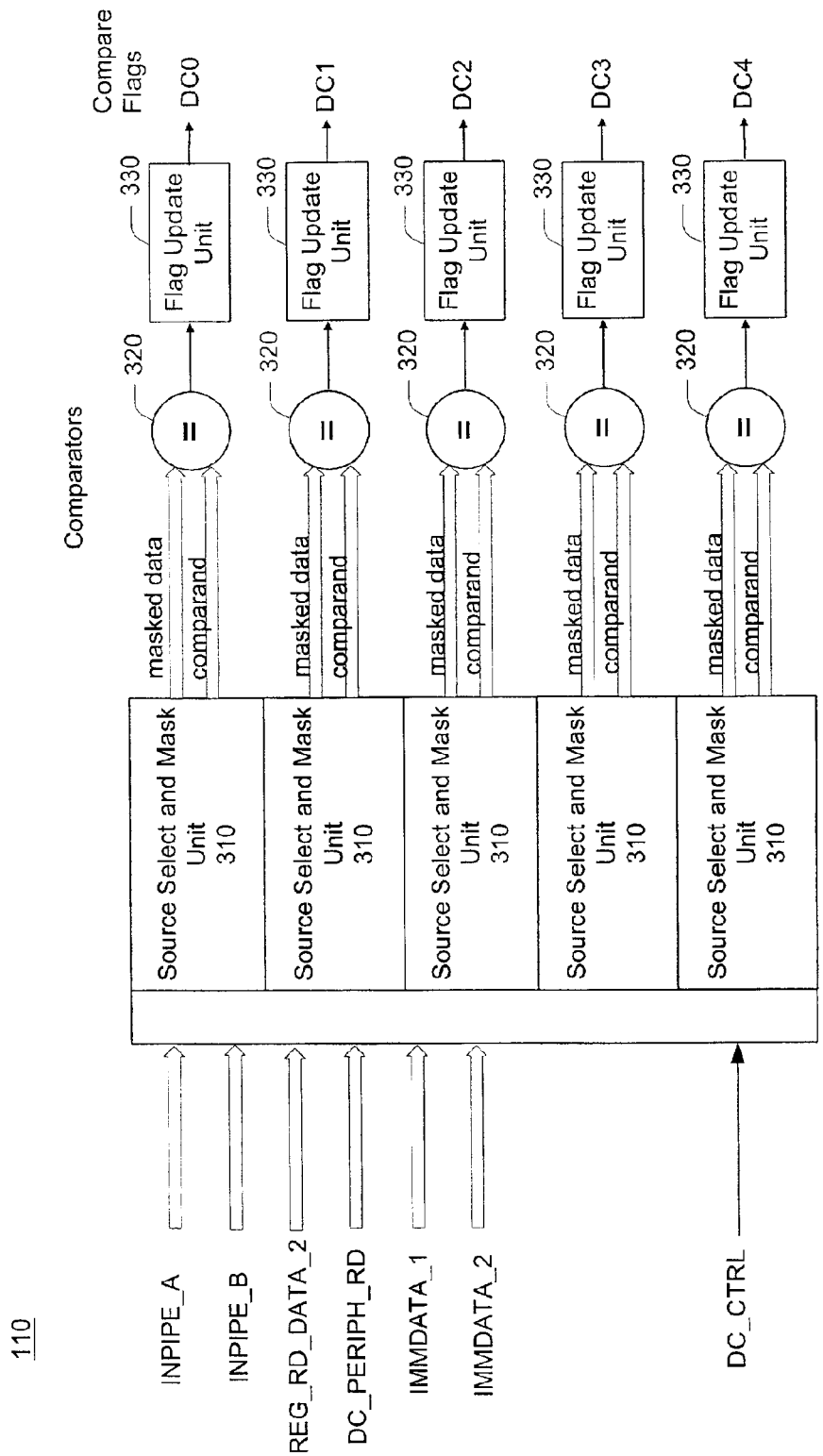
FIG. 3A is a block diagram illustrating an exemplary implementation of the data compare unit in accordance with one embodiment of the invention.
Figure 3B:
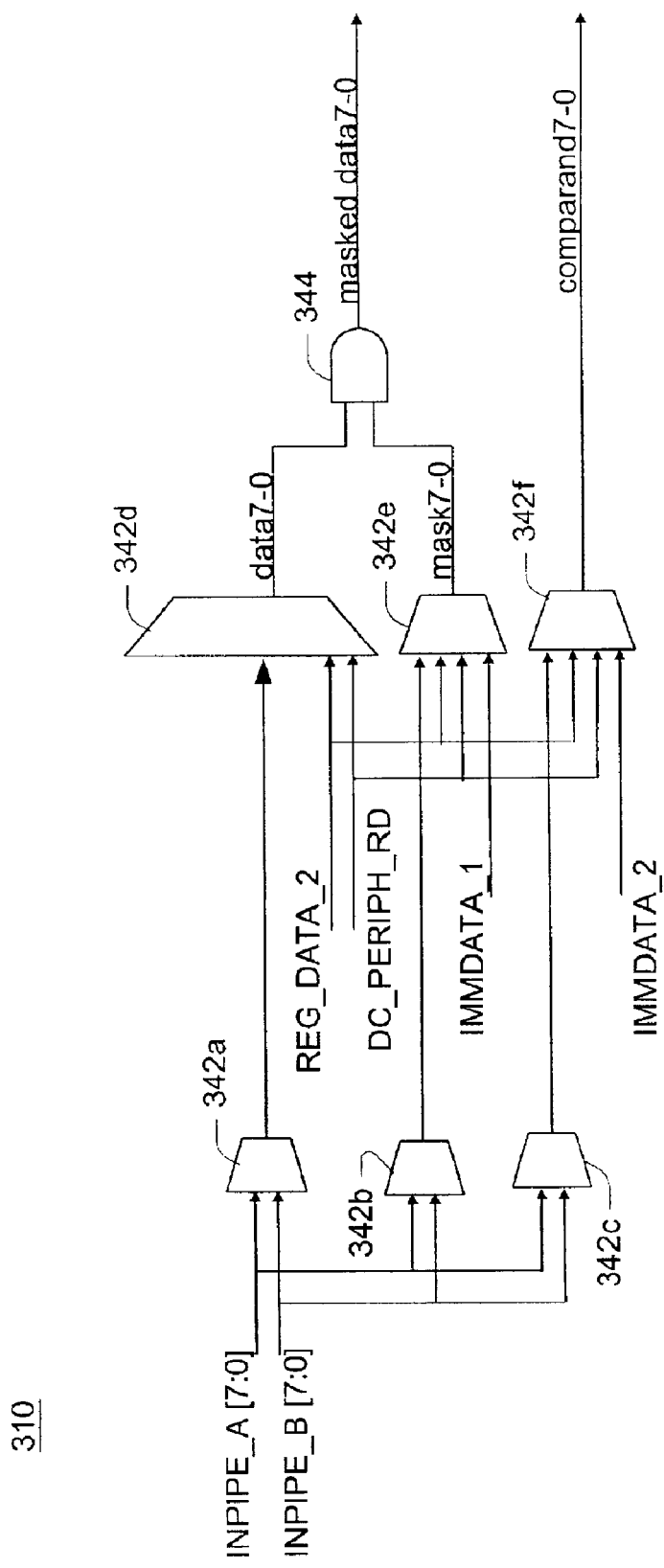
FIG. 3B is a block diagram illustrating an exemplary implementation of the source select and mask unit of FIG. 3A.
Figure 3C:
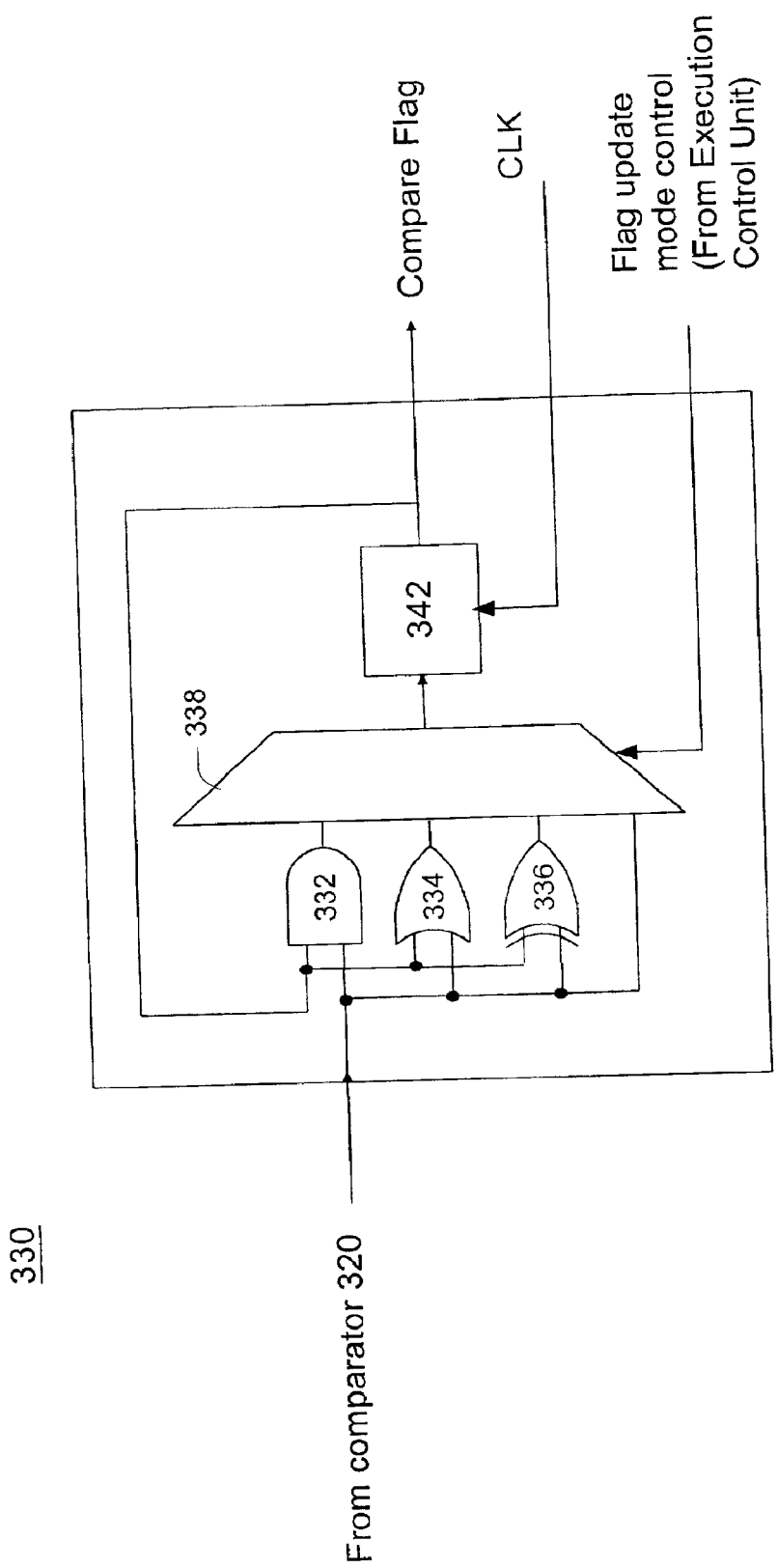
FIG. 3C is a block diagram illustrating an exemplary implementation of the flag update of FIG. 3A.

An exemplary implementation of the data compare unit 110 is illustrated in FIGS. 3A–3C. As shown in FIG. 3A, the data compare unit 110 includes source select and mask units 310, comparators 320 and flag update units 330. Each source select and mask unit 310 is configured for receiving data from the input pipeline unit 150 (via INPIPE_A, INPIPE_B), the register bank 170 (via REG_RD_DATA2), the peripheral unit 140 (via DC_PERIPH_RD) and the execution control unit 130 (via IMMDATA_1, IMMDATA_2). The source select and mask units 310 perform instruction-specified masking operations on the data to generate masked data and comparands to be provided to the comparators 320. The comparators 320 perform comparisons or "matching" operations between the masked data and the comparands to generate match outputs, which are provided to the flag update units 330. The flag update units 330 in turn generate a set of compare flags DC0, DC1, DC2, DC3 and DC4 based on instruction-specified flag update modes.

In the present embodiment, there is one compare flag for each 8-bit byte of the 40 bit input word, allowing multiple independent byte comparisons as well as whole 40-bit word comparisons in one instruction. It should be appreciated that the data to be masked and the comparands to be generated by the source select and mask units 310 are instruction-specified. Specifically, each of the select and mask units 310 receives the control signal DC_CTRL, which is generated by the execution control unit 130 according to a currently executed instruction.

FIG. 3B illustrates an exemplary implementation of a source select and mask unit 310 in accordance with an embodiment of the present invention. As illustrated, the source select and mask unit 310 includes 8-bit multiplexers 342a–342f. Although it is not illustrated in FIG. 3B, it is appreciated that the multiplexers 342a–342f are controlled by the signal DC_CTRL. Thus, the sources of the data, the mask and the comparand are specified by the currently executed instruction.

It should also be noted that the data paths within the illustrated source select and mask unit 310 are only eight bits wide. For example, the source select and mask unit 310 processes bit-0 to bit-7 of the 40-bit wide data. The remaining bits of the 40-bit data words are handled by the other source select and mask units 310 of the data modify unit 120.

As illustrated, multiplexes 342a–342c each includes inputs for receiving data from the input pipeline unit 150 (via INPIPE_A and INPIPE_B). The output of the multiplexer 342a is coupled to one of the inputs of multiplexer 342d, which also receives data from the register bank 170 (via REG_DATA2) and from the peripheral unit (via DC_PERIPH_RD). Thus, by applying the appropriate control signals, the output of the multiplexer 342d, which is the data to be masked, can be chosen from any one of these sources. Similarly, because multiplexer 342e is coupled to receive data from input pipeline unit 150 (via multiplexer 342b), the register bank 170, or the execution control unit 130 (via IMMDATA_1), the output of the multiplexer 342a, which is the mask data, may be chosen from any one of these data sources. The outputs of multiplexer 342e–342f are coupled to an AND-gate 344, which performs a masking operation on the data. In the present embodiment, the comparand may be selected from data within the input pipeline unit 150, the register bank 170, the peripheral unit 140 or the execution control unit 130 (via IMMDATA_2) when appropriate control signals are applied to multiplexers 342c and 342f.

FIG. 3C is a block diagram illustrating an exemplary flag update unit 330 in accordance with an embodiment of the present invention. The flag update unit 330 provides additional programmability and flexibility to the processor 100 by allowing the instruction to specify how the compare flags are updated. Particularly, as illustrated in FIG. 3C, the flag update unit 330 includes an AND-gate 332, an OR-gate 334, and XOR-gate 336, each having an input for receiving a comparison result from a comparator 320. The outputs of the logic gates are coupled to inputs of multiplexer 338. Responsive to a flag update mode control signal generated by the execution control unit 130, the multiplexer 338 selects one of the outputs of AND-date 332, OR-gate 334, XOR-gate 336, or the comparison results from the comparator 320, to be provided to a memory element 342 (e.g., a D-flip-flop). The output of the memory element 342 is fed back to the inputs of the logic gates 332, 334 and 336 to form feed-back loops. In this way, the flag update unit 330 updates the compare flags according to the instruction and according to the state of the compare flags in a previous instruction cycle. It should be noted that the memory element 342 is synchronous with the clock signal CLK that drives the input pipeline unit 150 and the execution control unit 130. Thus, the updated compare flags are provided to the execution control unit 130 for use in the next clock cycle.

An Exemplary Implementation of the Data Modify Unit

Figure 4:
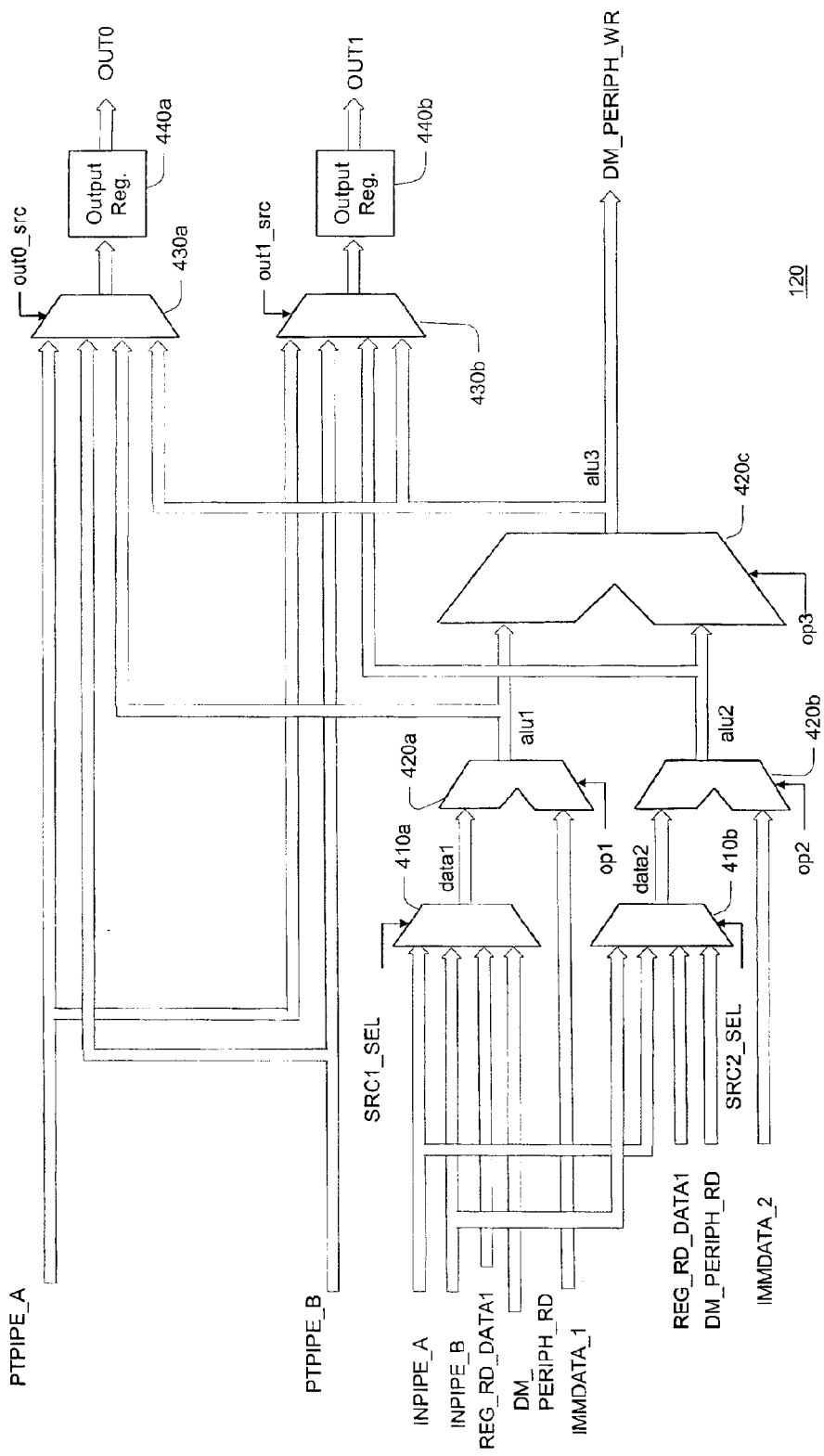
FIG. 4 is a block diagram illustrating an exemplary implementation of the data modify unit in accordance with an embodiment of the present invention.

FIG. 4 is a block diagram illustrating an exemplary implementation of the data modify unit 120 in accordance with an embodiment of the present invention. According to the present invention, the data modify unit 120 may access any instruction-specified data stored within the input pipeline unit 150, and modify the instruction specified data using an instruction-specified operator during one instruction cycle. The data modify unit 120 may also allow data to pass-through without any modification.

Particularly, as illustrated in FIG. 4, the data modify unit 120 includes two multiplexers 410a–410b, which are operable to receive data from input pipeline unit 150 (via INPIPE_A, INPIPE_B), the register bank 170 (via REG_RD_DATA1), or the peripheral unit 140 (via DM_PERIPH_RD). The outputs of the multiplexers 410a–410b are coupled to ALUs 420a–420b, which also receive data from the execution control unit 130 as operands (via IMMDATA_1, IMMDATA_2). The outputs of the ALUs 420a–420b are provided as inputs to another ALU 420c. The outputs of the ALUs 420a–420c are also provided to multiplexers 430a–430b. The multiplexers 430a–430b are also coupled to receive data directly from the pass-through pipelines PTPIPE_A and PTPIPE_B of the input pipeline unit 150. The control signals out0_src and out1_src, received from the control registers, are for selecting the inputs to the output multiplexers 430a and 430b, respectively. The output of the multiplexers 430a–430b are coupled to output registers 440a–440b, which provide data to the output busses OUT0 and OUT1 of the processor 100.

According the present embodiment, the sources of the data to be modified, as well as the operators, are instruction-specified. Particularly, the data modify unit 120 receives the control signals SRC1_SEL, SRC2_SEL, op1, op2, op3 (via control signal bus DM_CTRL), which are generated by the execution control unit 130 according to the current instruction. The control signals SRC1_SEL and SRC2_SEL are for selecting the inputs of multiplexers 410a–410b. The control signals "op1", "op2", and "op3" are for controlling the logic operations of ALUs 420a–420c. Thus, by using appropriate instructions, the data modify unit 120 may be configured for performing a variety of instruction-specified data modification operations during each clock cycle to generate the desired data for output.

Exemplary Applications of the Processor of the Present Invention

Figure 5:
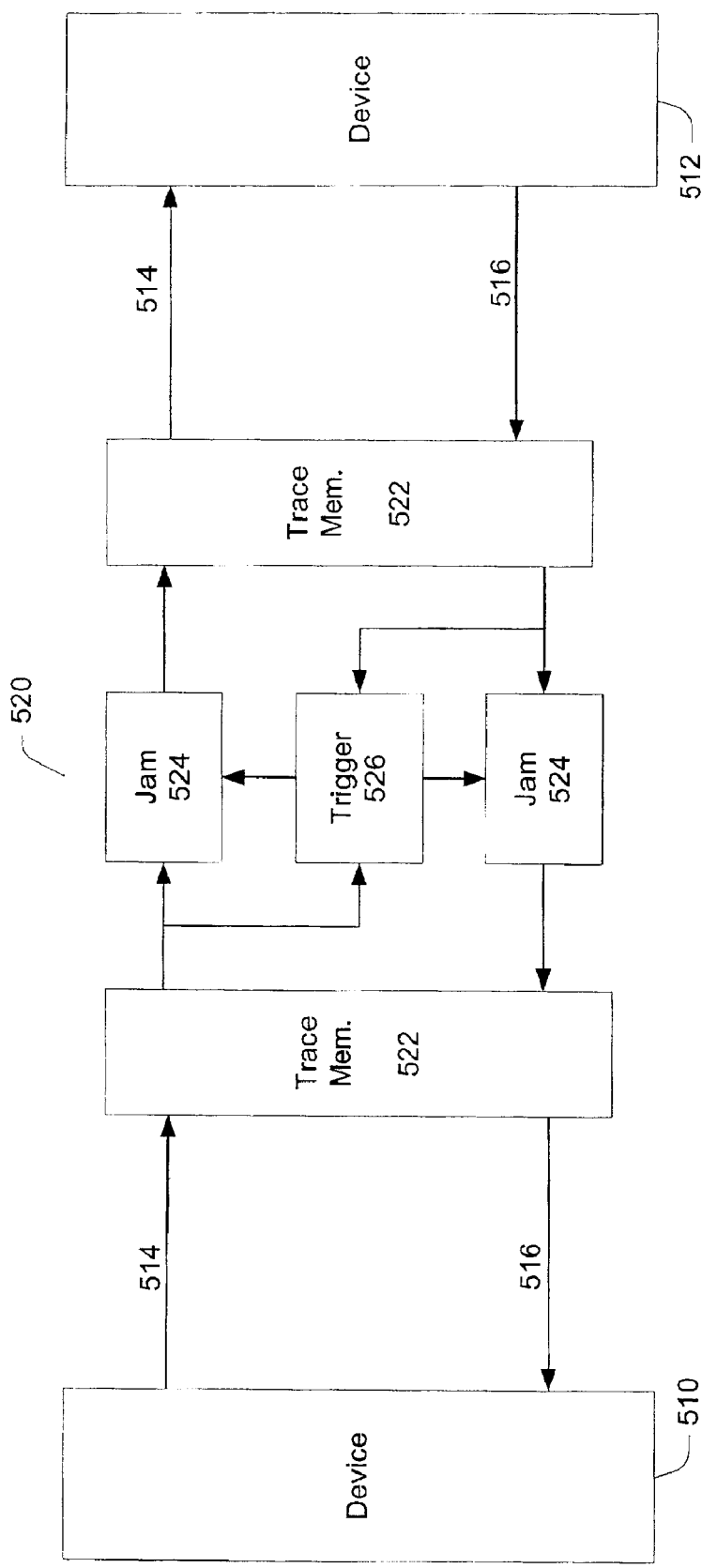
FIG. 5 is a block diagram illustrating an exemplary high-speed data modification system implemented with synchronous network data processors of the present invention.

FIG. 5 is a block diagram illustrating a high-speed data modification system 520 coupled between network devices 510 and 512. As illustrated, network devices 510 and 512 communicate with one another via high speed communication paths 514 and 516. Inserted into the high speed communication paths 514 and 516, the data modification system 520 enables real-time system-level testing of the devices 510 and 512 by injecting errors into the communication paths 514 and 516, and monitoring the responses of the devices 510 and 512.

As illustrated, data modification system 520 includes two trace memories 522 for capturing the data that are communicated between the devices 510 and 512 for output to an analyzer. Additionally, data modification system 520 includes a trigger subsystem 526 and two data jammers 524. The trigger subsystem 526 monitors the data paths 514 and 516, waiting for a datum in the streams to match a predefined pattern. When the trigger subsystem 526 detects an input datum matching the predefined pattern, the trigger subsystem 526 generates a trigger signal to the data jammers 524. The data jammers 524 respond to the trigger signal by "jamming"—altering selected portions of the input datum in a predefined manner in real time.

The trigger subsystem 526 and the data jammers 524 may be implemented with the high-speed synchronous network data processor of the present invention. Particularly, one synchronous network data processor 100 may be used to implement the trigger subsystem 526 by loading appropriate data compare instructions and data modify instructions into the processor. Each of the data jammers 524 may also be implemented with a synchronous network data processor 100 by loading appropriate instructions therein. A significant advantage of using the synchronous network data processor of the present invention in the data modification system 520 is that the system may be re-programmed for different types of protocols as well as to perform different tasks.

Figure 6:
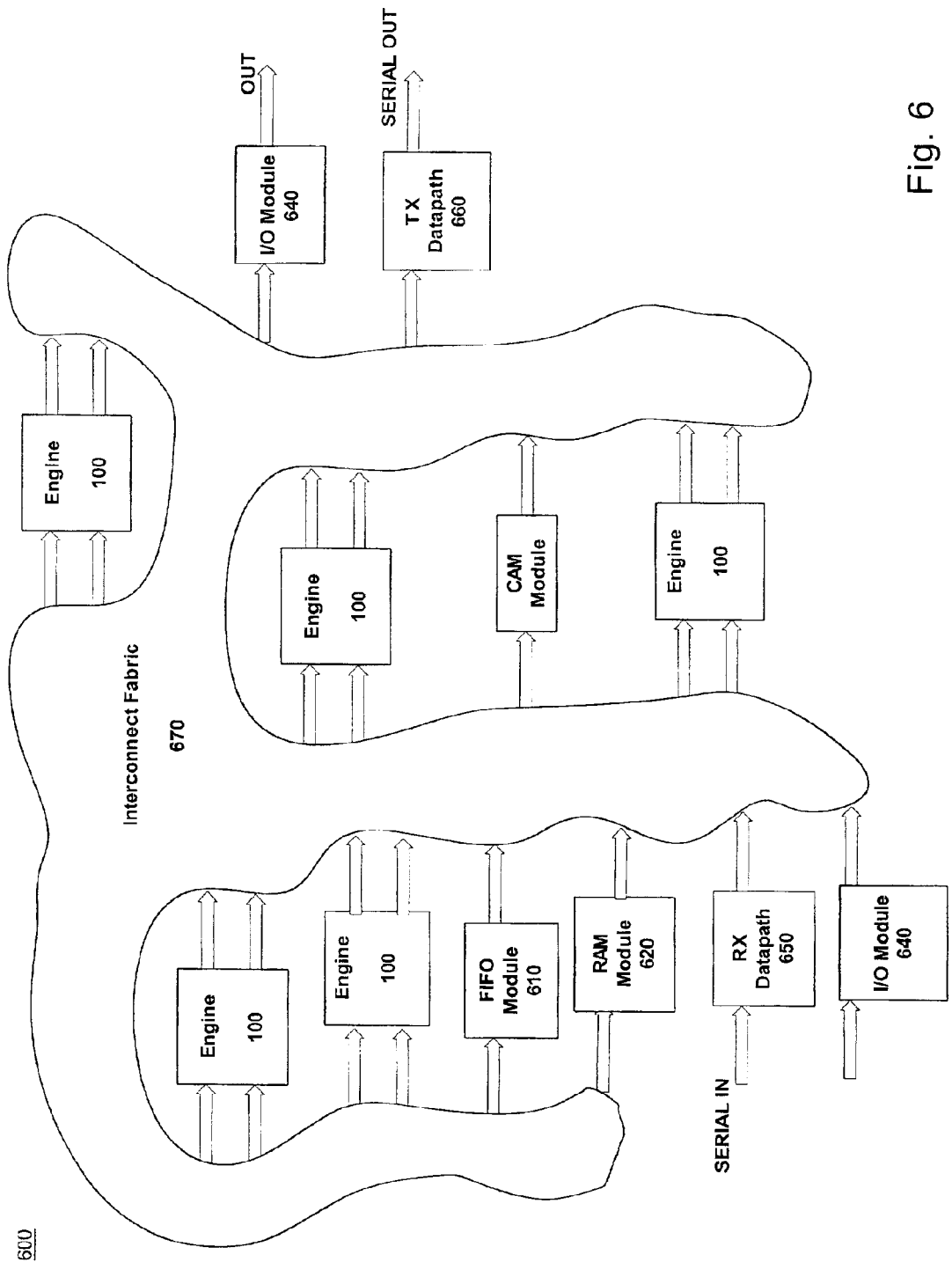
FIG. 6 is a block diagram illustrating a general network data processing system implemented with synchronous network data processors of the present invention.
Figure 2B:
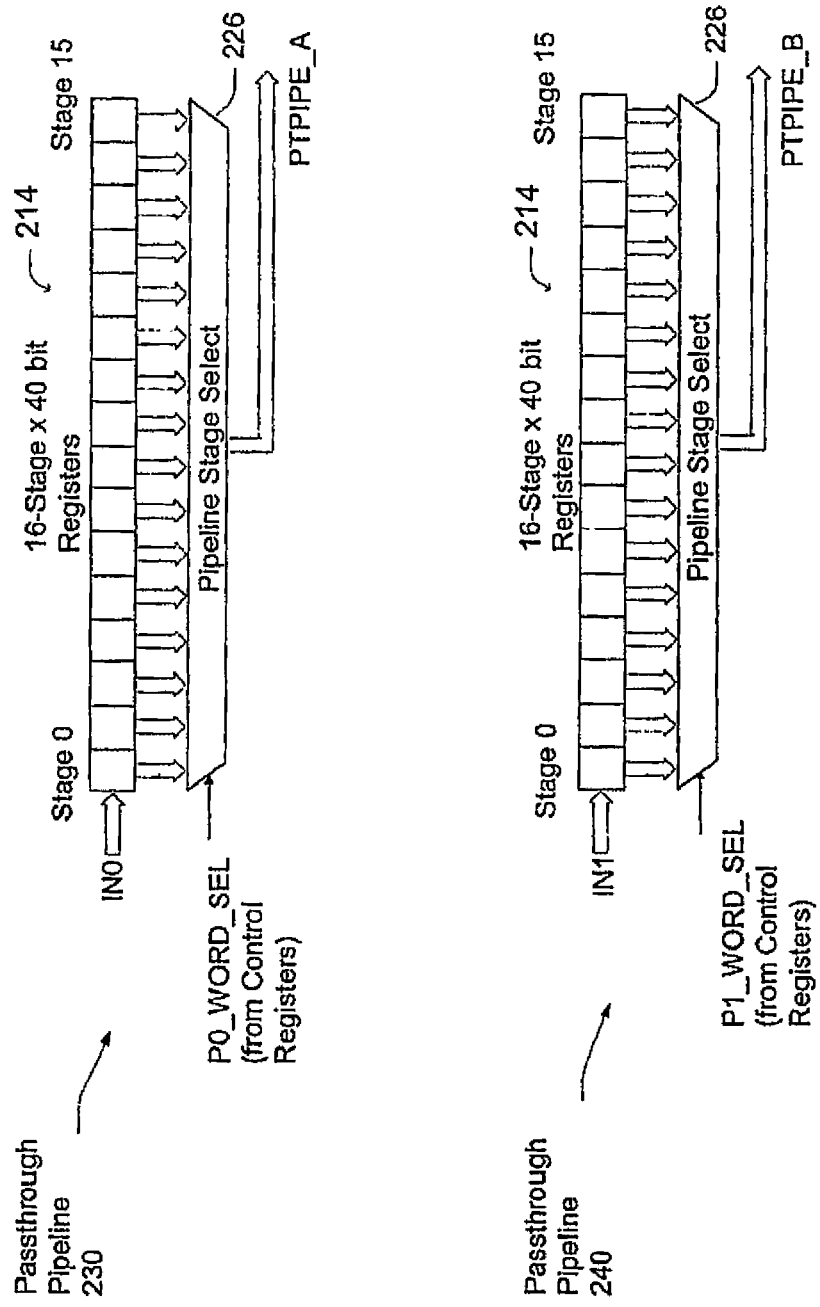

Application of synchronous network data processor of the present invention is not limited to data modification systems. FIG. 6 is a block diagram illustrating a general network data processing system 600 implemented with synchronous network data processors of the present invention. As shown, the general network data processing system 600 includes four synchronous network data processor 100 interconnected by an interconnect fabric 670. Also interconnected by the interconnect fabric 670 are a FIFO module 610, a RAM module 620, a CAM module 630, I/O modules 640, a RX data path 650, and a TX data path 660. According to the present invention, the RX data path 650 is a inbound serial-to-parallel interface, and the TX data path module 660 is an outbound parallel-to-serial interface. The I/O modules 640 are for coupling the network data processing system 600 to data analyzers and other network data processing systems.

Branch Control and Conditional Execution of Instructions by the Processor

According to the present invention, the processor 100 may execute every instruction conditionally. Further, every instruction may specify up to two different conditional relative branches, each with its own destination address. In the present embodiment, conditional execution control fields are shared with the control files for the second branch. If conditional execution is used, the second branch is disabled or use the same condition.

The bits that are examined when determining whether to conditionally branch, execute, or trap are referred to as the "flags," and are held in the flags register of the execution control unit 130. There are six flags in total, which include the five flags generated by data compare instructions (DC4–DC0) and one programmable "P" flag generated by the peripheral unit 140. The "P" flag is selectable from one of several sources including counter wrap flags, the external memory interface ready signal, and the carry output of the data modify unit 120. The format of the flags register is shown below in Table 1.

TABLE 1

| Bit | 39-6 | 5 | 4 | 3 | 2 | 1 | 0 |
|---|---|---|---|---|---|---|---|
| Name | Reserved | P | DC4 | DC3 | DC2 | DC1 | DC0 |

A branch or execute condition is specified by three fields: Mask, Match, and True/False. Mask and Match are the same width as the flags register (40-bit), and True/False is a single bit. The execution control unit 130 evaluates the condition by logically ANDing the flags with Mask, and then comparing this result to Match. If the comparison result (True if equal, False if not equal) is the same as the True/False bit, the condition is considered satisfied and the branch or conditional execution takes place.

The branch conditions and the execution conditions of an instruction are defined by its common control fields. The syntax and operations of the common control fields are described below in Table 2.

TABLE 2

| Common Control Field | Function |
|---|---|
| br(mask1, match1, tf1, addr1,mask2, match2, tf2, addr2) | Conditional branch control. The two conditions are evaluated as described above. If condition 1 is satisfied, a branch is taken to addr1. Otherwise, if condition 2 is satisfied, a branch is taken to addr2. Otherwise, control transfers to the following instruction. Legal values are any 6-bit constant for the mask and match fields, T or F for the tf field, and a 12-bit constant or a label (string) for addr1 and addr2. The second branch condition and address may be omitted if not used. If no branch control field is given at all, control falls through to the next instruction. The second branch condition is shared with the execute condition; therefore if both conditional execution and the second branch are used, their conditions must be the same. When the second branch is not specified, the assembler encodes either an always-satisfied condition or the execute condition specified by the exec_on() field. In each case, the second branch target is the next instruction. When neither branch is specified, the assembler encodes always-satisfied conditions for both branches, and the next instruction for both branch targets. Address 0xF80 has a special function when used as the branch 2 address. It causes a branch to the program counter (PC) saved by a previous subroutine call and is used to return from the subroutine. The branch 2 mask/match/tf controls still function normally, allowing conditional returns. |

TABLE 2-continued

| Common Control Field | Function |
|---|---|
| exec_on(mask, match, tf) | Conditional execution control. The condition is evaluated as described above. If it is satisfied, the instruction executes; otherwise it does not execute (is treated as a no-op). All common control fields with the exception of bg_run are active regardless of whether the instruction executes or not. The execute condition is shared with the second branch condition (see above). If no conditional execution control field is specified, the instruction executes. |
| save_pc(ctrl) | Save the current program counter (PC). Used to implement subroutine calls. The ctrl field defines how the PC is saved: 0: don't save PC 1: store current address + 1 to saved_PC (subroutine returns to next instruction) 2: store branch address 2 to saved_PC (subroutine returns to branch address 2. Branch 2 still behaves normally). Others: reserved |
| bg_run | When present, causes the instruction to run in the background (i.e., execute continuously until interrupted by the execution of another instruction of the same type). If not present, the instruction executes for the present instruction cycle only. Once an instruction is running in the background, it is no longer subject to any execution condition it may have been issued with. An interruption of a background-running instruction occurs only if the interrupting instruction actually executes; i.e., its execution condition is satisfied. While background run mode is only supported for data compare instructions in one preferred embodiment, in an alternate embodiment background run mode is supported for both data compare and data modify instructions.. |

Some pseudo-control operations that can be implemented using the execution control fields are shown below in Table 3. Appropriate macros for these can be defined in a standard header file. Software written using the pseudo-control codes may be translated into the processor-specific common control fields using a pre-processor.

TABLE 3

| Pseudo-control | Operation | Implementation |
|---|---|---|
| jmp | Jump to address (unconditionally) | br(0, 0, T, addr) |
| jsr | Jump to subroutine (unconditionally) | br(0, 0, T, subr) save_pc(1) |
| jsrr | Jump to subroutine; return to specified address (unconditionally) | br(0, 0, T, subr, 0, 0, T, retaddr) save_pc(2) |
| ret | Return from subroutine (unconditionally) | br(0, 0, F, 0, 0, 0, T, 0xF80) |
| bcs | Branch if carry set (P = DM carry flag) | br(0x20, 0x20, T, addr) |
| bcc | Branch if carry clear (P = DM carry flag) | br(0x20, 0x20, F, addr) |
| loop | Jump if still in loop (P = counter wrap flag) | br(0x20, 0x20, F, addr) |
| exec_loopend | Execute on end of loop (P = counter wrap flag) | exec_on(0x20, 0x20, T) |
| br_c8t/f | Branch on 1–5 byte comparison true/false | br(0x01, 0x01, T/F, addr) |
| br_c16t/f | | br(0x03, 0x03, T/F, addr) |
| br_c24t/f | | br(0x07, 0x07, T/F, addr) |
| br_c32t/f | | br(0x0f, 0x0f, T/F, addr) |
| br_c40t/f | | br(0x1f, 0x1f, T/F, addr) |

Data Compare Instructions Executable by the Processor

Data compare instructions perform a three operand (data, mask, and match) comparison operation of up to 40 bits at a time. The sources of the data to be compared can be the input pipeline unit 150, the register bank 170, the peripheral unit 140, and/or the execution control unit 130. According to the present embodiment, the input pipelines are fed from the processor's input busses IN0 and IN1, and the pipeline stage read by the compare instruction can be selected on the fly by the currently executed instruction.

Data compare instructions are carried out by the data compare unit 110 which includes five independent 8-bit comparators 330, each of which has selectable inputs for its data, mask, and match values. Each comparator 330 updates its own comparison result flag, which can be used as part of a conditional branch or execution condition. This flag can either be set to the comparison result, or to the logical AND, OR, or XOR of the comparison result and current flag value.

The syntax of a data compare instruction executable by the processor 100 is:

compare data, mask, match [data compare specific control fields] [Common control fields];

The C-equivalent logical operation performed by a data compare instruction is described below in Table 4.

TABLE 4

```
for (comp = 0; comp < 5; comp++) // do all 5 comparators
{
    // perform 8-bit mask/match comparison
    if ((data[comp] & mask[comp]) == match[comp]) result[comp] = 1;
    else
        result[comp] = 0;
    // update comparison result flag (SET, AND, OR, or XOR)
    switch(update_mode)
    {
        case SET: flag[comp] = result[comp]; break;
        case AND: flag[comp] &= result[comp]; break;
        case OR:  flag[comp] |= result[comp]; break;
        case XOR: flag[comp] ^= result[comp]; break;
    }
}
```

The compare flags are updated one clock after the instruction executes, and therefore may be used in the following instruction. Note that if a branch or execute condition is used in the same instruction as the compare, the flag values are those that existed BEFORE the compare instruction executes.

Although data for the data compare instructions may come from numerous sources and may be specified on the fly by the currently executed instruction, there are a few limitations. Table 5 below shows the legal values for the three comparator source fields.

TABLE 5

| Source Mnemonic | Input Pipeline A ina[n] | Input Pipeline B inb[n] | Register Bank r[n] | Peripheral Data periph[n] | Immediate data [value] |
|---|---|---|---|---|---|
| data | YES | YES | YES | YES | NO |
| mask | YES | YES | YES | YES | YES |
| match | YES | YES | YES | YES | YES |

The comparator source fields are also subject to the following restrictions:

(A) If an input pipe is used for the mask source, it may not be the same as that used for the data.

(B) If the same input pipe is used in more than one source, the pipe word number (n) (i.e., the point at which the input pipe is tapped) must be the same in both uses.

(C) If a register or peripheral is used in more than one source, the number (n) must be the same in both uses. The parameters of r and periph are the register or internal peripheral number. Legal values for these parameters are 0–15.

The immediate data value is a 40-bit constant specified in the instruction. Two different values may be specified for the mask and match fields.

The parameters of the input pipelines specify the stage in the input pipelines from which data are accessed. For example, an instruction including the field "ina[4]" indicates using the word in the fourth stage of input pipeline INPIPE_A. Legal values for these parameters are 0–15. The input bus feeding each pipeline and the pipeline enables are set by fields in the control registers 144.

Table 6 shows the type-specific control fields that are supported by data compare instructions.

TABLE 6

| Control Field | Function |
|---|---|
| byte_sel(c4, c3, c2, c1, c0) | Selects the byte number of the 40-bit source word to apply to each comparator's data input. This field is only valid when using an input pipe as the data source, and has no effect otherwise. Legal values for c4–c0 are 4–0 (byte 4 is the msb of the 40 bit input word, and byte 0 is the lsb). For the mask and match fields, or for non input pipe data sources, the byte number of the input word is the same as the comparator number; e.g., the third comparator uses byte 3 of the mask word. If this field is not given, the byte selects default to the previous values given, or 4,3,2,1,0 if no previous values were given. |
| update_mode() | Used in conjunction with the FLAG_UPD_CFG field of the control registers to set the flag update mode for all comparators. The truth table for FLAG_UPD_CFG can be found in Appendix-A. Legal values for mode are 0 and 1. If this field is not given, the mode defaults to the previous value given, or "0"if no previous value was given. |

Data compare instructions may be run in background mode by applying the bg_run common control field to the instruction. In background run mode, a data compare instruction runs continuously, updating the compare flags, until the next compare instruction executes. Normal conditional branching and execution may be performed based on the flags generated by the background-running instruction.

Instruction examples illustrating both legal and illegal uses of the data compare instructions are illustrated below in Table 7.

TABLE 7

| Code Examples | Description |
|---|---|
| compare ina[0], 0xffffffffff, 0x123456789a byte_sel(4, 3, 2, 1, 0) update_mode(SET); | 40-bit straight comparison of the word in the first stage of input pipe A to a constant. The word was equal to 0x123456789a if all five comparator flags are true after the instruction executes. |
| compare ina[0], 0xfffffffff0, 0x1234567890; | Same as above but with the lower 4 bits masked off (ignored in the comparison). The control fields default to the previous values used if not specified. |

TABLE 7-continued

| Code Examples | Description |
|---|---|
| compare ina[0], r[2], inb[8]; | Compare the first stage of input pipe A with the ninth stage of input pipe B, after masking the data in pipe B with data in r[2]. |
| compare inb[12], r[8], periph[4]; | Compare Pipe B stage 12 with peripheral 4, using mask in r[8]. |
| compare ina[1], r[2], inb[0]; | Compare a word in the input pipeline to the word received one clock ago. Assumes Pipes A and B both have the same source bus (in0 or in1). (The pipe source busses are set by bits in CTRL_REG). |
| compare inb[4], ina[0], ina[0]; | See if all the bits set in the first stage of input pipe A are also set in the fifth stage of input pipe B. |
| compare inb[4], r[13], r[13]; | Same as above, but using registers. |
| compare ina[0], 0x0fffffff, SOFi3 bg_run; | Background run example: start up the compare unit looking for SOFi3 in the input data stream, and then let other instructions execute. "SOFi3" is a C-style definition of the numeric value of a "start of frame" ordered set. |
| compare ina[3], 0xffffffff, 0x123456789a byte_sel(2, 2, 2, 2, 2); | Byte_sel example: Compare input pipe A stage 3 byte 2 with five different values (0x12, 0x34, 0x56, 0x78, and 0x9a). The five flags hold the results of the five comparisons. |
| compare ina[3], 0x73ff3f7ff8, 0x123456789a, byte_sel(2, 2, 2, 2, 2); | Same as above, but with five different 8-bit masks for the comparisons. |
| compare ina[3], 0xffffffff, 0xaa12345678 byte_sel(4, 1, 0, 1, 0); | Compare the 16-bit word in Pipe A stage 3 bytes 1–0 to two different values (0x1234 and 0x5678), and byte 4 to 0xaa. |
| compare ina[7], 0xffffffff; WORD_A update_mode(SET); compare ina[7], 0xffffffff, WORD_B update_mode(AND); compare ina[7], 0xffffffff, WORD_C update_mode(AND); | Update_mode example: if WORD_A, WORD_B, and WORD_C are received in succession. The comparison flags are set on the first comparison, then ANDed with the current flags. The pipes advance 1 stage per instruction, so reading the same pipe word on successive instructions has the effect of reading successive input words. This could alternatively be done with conditional branching. If the five flags are true after execution of the third compare instruction, the three specified words have been received in succession. |
| compare ina[1], 0xff, ina[2]; compare r[2], 0xff, r[4]; compare ina[3], periph[2], periph[3]; compare inb[0], inb[0], 0xff; compare 0xff, ina[1], r[2]; | Examples of illegal usages. |

Data Modify Instructions Executable by the Processor

A description of the data modify instructions executable by the processor 100 of the preferred embodiment follows. Data modify instructions perform arithmetic and logic operations using up to four operands and three operation codes (opcodes), and store the results to one or more write destinations. The instructions use the same sources as data compare instructions: the input pipeline unit 150, the register bank 170, the peripheral unit 140, or immediate data from the execution control unit 130 as defined in the currently executed instruction.

Data modify instructions are performed by the data modify unit 120, which includes three two-operand arithmetic logic units ALU1–ALU3. ALU1 and ALU2 have their first operand (X) selectable from among the input pipeline unit 150, the register bank 170, or the peripheral unit 140. Their second operand (Y) is an immediate data value provided by the execution control unit 130 and specified in the currently executed instruction. The operands of ALU3 are the outputs of ALU1 and ALU2. ALU3 also generates a carry flag, which can be selected as a source flag for conditional branching or execution.

An optional ALU-bypass mode is available to the instructions. In the ALU-bypass mode, the results from ALU1 and ALU2 are provided to the output busses (OUT0 and OUT1), bypassing the ALU3. This mode allows both busses to be updated with one instruction.

The data modify unit 120 also supports an internal pass-through mode where data from the input pipeline unit 150 are provided directly to the output busses OUT0 and OUT1. In this pass-through mode, "default" data can be supplied to the output busses whenever data modify instructions are not executing. The pass-through operation is configured by fields in the control registers 144 of the peripheral unit 140. The opcodes supported by data modify instructions are shown below in Table 8. Operations are shown as C equivalents.

TABLE 8

| Opcode | Operation | Description | Supported by ALU's |
|---|---|---|---|
| and | X & Y | Bitwise logical AND of X and Y | 1, 2, 3 |
| or | X \| Y | Bitwise logical OR of X and Y | 1, 2, 3 |
| xor | X ^ Y | Bitwise logical XOR of X and Y | 1, 2, 3 |
| nor | ~(X \| Y) | Bitwise logical NOR of X and Y | 1, 2 |
| ror8a | ror(X, 8) & Y | Rotate X right 8 bits, AND with Y | 1 |
| ror1a | ror(X, 1) & Y | Rotate X right 1 bit, AND with Y | 1 |
| rol8a | rol(X, 8) & Y | Rotate X left 8 bits, AND with Y | 2 |
| rol2a | rol(X, 2) & Y | Rotate X left 2 bits, AND with Y | 2 |
| add | X + Y | Sum of X and Y | 3 |
| addp1 | X + Y + 1 | Sum of X and Y, plus 1 | 3 |
| pass_imm | Y | Pass Y (immediate data) to result | 1, 2 |
| tbd12 | tbd | tbd | 1, 2 |
| tbd3_a | tbd | tbd | 3 |
| tbd3_b | tbd | tbd | 3 |
| tbd3_c | tbd | tbd | 3 |

Table 9 below shows pseudo-opcodes that may be implemented using the native opcodes. Appropriate macros for these can be defined in a standard header file.

TABLE 9

| Pseudo-op | Operation | Description | Implementation | Note |
|---|---|---|---|---|
| nop | (none) | No operation | null = or(0, 0) | |
| not | ~A | Bitwise inverse of A | xor(A, 0xffffffff) | |
| inc | A + 1 | Increment A | add(A, 1) or addp1(A, 0) | |
| dec | A − 1 | Decrement A | add(A, 0xffffffff) | |

TABLE 9-continued

| Pseudo-op | Operation | Description | Implementation | Note |
|---|---|---|---|---|
| sub | A − B | Difference of A and B | addp1(A, not(B)) | |
| subi | A − B | Difference of A and B, B constant | addp1(A, ~B) | |
| neg | −A | Negate A | addp1(0, not(A)) | |
| adc | A + C | Sum of A and carry | add(A, 1) exec_on(0x20,0x20,T) | 1 |
| sec | C = 1 | Carry = 1 | add(1, 0xffffffffff) | |
| clc | C = 0 | Carry = 0 | add(0, 0) | |
| testge | A >= B | Carry = 1 if A >= B, 0 if A < B | null = sub(A, B) | |
| testnz | A != 0 | Carry = 1 if A != 0, 0 if A >= 0 | null = add(A, 0xffffffffff) | |
| testneg | A < 0 | Carry = 1 if A < 0, 0 if A == 0 | null = add(A, 0x8000000000) | |
| ror8 | ror(A, 8) | Rotate A right 8 bits | ror8a(A, 0xffffffffff) | |
| rol8 | rol(A, 8) | Rotate A left 8 bits | rol8a(A, 0xffffffffff) | |
| shr | A >> 1 | Shift A right 1 bit | ror1a(A, 0xefffffffff) | |
| shl | A << 1 | Shift A left 1 bit | add(A, A) | |
| shr8 | A >> 8 | Shift A right 8 bits | ror8a(A, 0x00ffffffff) | |
| shl8 | A << 8 | Shift A left 8 bits | rol8a(A, 0xffffffff00) | |
| shrn | A >> N | Shift A right N bits (N = 1..39) | (Various) | 2 |
| shln | A << N | Shift A left N bits (N = 1..39) | (Various) | 2 |
| bset | bset(A, N) | Set bit N in A | or(A, 1 << N) | |
| bclr | bclr(A, N) | Clear bit N in A | and(A, ~(1 << N)) | |
| bswap01 | bswap(0,1) | Swap bytes 0 and 1 in A, zero others | or(ror8a(A, 0x00000000ff), rol8a(A, 0x000000ff00)) | |
| bswap12 | bswap(1,2) | Swap bytes 1 and 2 in A, zero others | or(ror8a(A, 0x000000ff00), rol8a(A, 0x0000ff0000)) | |
| bswap23 | bswap(2,3) | Swap bytes 2 and 3 in A, zero others | or(ror8a(A, 0x0000ff0000), rol8a(A, 0x00ff000000)) | |
| bswap34 | bswap(3,4) | Swap bytes 3 and 4 in A, zero others | or(ror8a(A, 0x00ff000000), rol8a(A, 0xff00000000)) | |

Notes:
(1) Assumes P flag is programmed to be the ALU3 carry flag. See the PERIPH_CTRL register.
(2) Can be implemented with multi-instruction macros using ror1a, ror8a, rol2a, and rol8a opcodes. Worst case N requires 5 instructions.

Data modify instructions write their results to one or more of the following write destinatins: either of the two output bussed OUT0 and OUT1, the register bank 170, or the peripheral unit 140.

The syntax of the data modify instructions in normal mode is:

dest1 [,dest2 . . . ]=op3(op1(src1, imm1), op2(src2, imm2)) [Common control fields];

ALU3 bypass mode is specified by assigning one or more of the output busses to the ALU1 or ALU2 results, using the following syntax.

dest1 [,dst2 . . . ]=op3(out0=op1(src1, imm1), op2(src2, imm2)) [Common control fields];

dest1 [,dest2 . . . ]=op3(op1(src1, imm1), out1=op2(src2, imm2)) [Common control fields];

dest1 [,dest2 . . . ]=op3(out0=op1(src1, imm1), out1=op2(src2, imm2)) [Common control fields];

The first syntax places out0 in bypass mode. The second syntax places out1 in bypass mode, and the third places both outputs in bypass mode. When an output is in bypass mode, it is illegal to also use it as an ALU3 destination.

The operation codes op1–op3 are for ALUs 420a–420c, respectively; src1 and src2 are the selectable source fields for ALU 420a and ALU 420b, and imm1 and imm2 are the two 40-bit immediate data values. The C-equivalent logic operation performed by a data modify instruction is illustrated below in Table 10.

TABLE 10

```
result1 = alu12_operation(op1, src1, imm1);
result2 = alu12_operation(op2, src2, imm2);
if (out0_bypass)
    out0 = result1;
if (out1_bypass)
    out1 = result2;
dest(s) = alu3_operation(op3, result1, result2);
```

Additionally, the ALU3 carry flag is updated if the ALU3 opcode is "add" or "addp1" (other opcodes and DC instructions do not change the carry flag value). The carry is set if the addition overflowed, and cleared otherwise. In addition to arithmetic operations, the carry flag (not shown) can be used as a general-purpose branch and execute control flag.

Table 11 below shows the legal sources for the source (src1 and src2) and destination (dest) fields of a data modify instruction. Note that null can be specified for dest, in which case the ALU3 result is ignored. The immediate data operands (imm1 and imm2) are 40-bit constants specified in the instruction.

TABLE 11

| Source/Dest Mnemonic | Input 0 Pipeline in0[n] | Input 1 Pipeline in1[n] | Register Bank r[n] | Peripheral Data periph[n] | Output Bus out0 | Output Bus out1 | None null |
|---|---|---|---|---|---|---|---|
| src1 | YES | YES | YES | YES | NO | NO | NO |
| src2 | NO | YES | YES | NO | NO | NO | NO |
| dest | NO | NO | YES | YES | YES | YES | YES |

The parameters of r and periph are the register or internal peripheral number. Legal values for these parameters are 0–15.

The parameters of in0 and in1 are the word in the input pipeline register to operate on. For example, in0[4] means use the word in stage 4 of the input 0 pipeline. Legal values for these parameters are 0–15.

In the present embodiment, the source and destination fields are subject to the following additional restrictions:

(A) If the same input pipe is used in more than one source, the pipe word number (n) must be the same in both uses.

(B) If two registers are used as sources and a register is also used as a destination, the register number (n) of one of the source registers must be the same as that of the destination register.

(C) If a peripheral is used in more than one source, the number (n) must be the same in both uses.

(D) If both a register and peripheral are used as destinations, the number (n) must be the same in both uses.

(E) No more than one register may be used as a destination.

(F) No more than one peripheral may be used as a destination.

Table 12 below illustrates some exemplary usages of the data modify instructions.

TABLE 12

| Code Examples | Description |
| --- | --- |
| out0 = in0[0]; | Pass-through data. |
| out1 = r[4]; | Output data from register. |
| out0 = 0x08BCB51717; | Send an SOF (Start of Frame). |
| r[0] = 0x12345678; | Initialize register to constant. |
| r[1] = r[0 ]; | Move register to register. |
| r[2] = periph[3]; | Move peripheral value to register (save DC flags). |
| periph[3] = r[2]; | Move register to peripheral. |
| r[3] = in0[1]; | Move input value to register. |
| periph[11] = 0xaa; | Store constant to peripheral. |
| r[0] = r[0]; | No operation. |
| r[0] = add(r[0], r[1]); | Add register to register. |
| out1, r[6] = 0x0123456789; | set output and register to 40 bit constant |
| out0, out1, r[12] = periph[3]; | set both outputs and register to peripheral value |
| out0, out1, r[5], periph[5] = in1[3]; | Multiple destinations. |
| r[0] = or(out0 = 1, out1 = 2) | ALU-3 bypass mode. |
| null = or(out0 = 1, out1 = 2) | ALU-3 results ignored. |
| out0 = or(r[2], periph[3]); | Logical OR of register and peripheral value |
| out0 = xor(in0[0], 1); | Toggle bit 0 of input, send to output bus 0 |
| r[3] =and(in1[6], 0xffff); | Store lower 16 bits of input to r[3] |
| r[7] =add(r[7], 1); | increment r[7] |
| out0 = or(and(in1[4], 0xffffff00), 0x8b); | output = input with byte 0 changed to 0x8b |
| out0, out1, r[3], periph[3] = addp1(xor(in0[8], 0x123456789a), or(periph[2], 0xfedcba9876)); | Example of complex data modify instruction. |
| r[3], periph[3] =addp1(out0 = xor(in0[8], 0x123456789a), out1 = or(periph[2], 0xfedcba9876)); | With ALU3 bypass mode on both outputs |
| r[3], periph[3], out1 = addp1(out0 = xor(in0[8], 0x123456789a), or(periph[2], 0xfedcba9876)); | With ALU3 bypass mode on OUT0 only |
| r[3], periph[3], out0 = addp1(xor(in0[8], 0x123456789a), out1 = or(periph[2], 0xfedcba9876)); | With ALU3 bypass mode on OUT1 only |

TABLE 12-continued

| Code Examples | Description |
| --- | --- |
| out0 = or(in0[1], in0[2]); | Examples of illegal usage |
| r[0]= and(r[1], r[2]); | |
| r[0] = add(periph[0], periph[1]); | |
| r[0], periph[1]= 2; | |
| r[0], r[1]= 0; | |
| periph[0], periph[1]= r[6]; | |

Peripheral Unit and Control Registers

The peripheral unit 140 is accessed via a set of registers referenced by the instructions as periph[n]. The peripheral unit 140 is divided into a number of subunits, which are described in more detail below. Table 13 below shows the address map of the subunits and registers in the peripheral unit.

TABLE 13

| Register Name | Address | Description | Subunit | Read/Write |
| --- | --- | --- | --- | --- |
| EXT_WR_DATA | periph[0] | External Memory Interface write data with normal addressing | External Memory Interface Unit | W |
| EXT_RD_DATA | periph[0] | External Memory Interface read data with normal addressing | External Memory Interface Unit | R |
| MAILBOX_W | periph[1] | Mailbox Register to host | Local Interface Unit | W |
| MAILBOX_R | periph[1] | Mailbox Register from host | Local Interface Unit | R |
| CTR_32 | periph[3] | Counter 3 (upper 20) and Counter 2 (lower 20 bits) | Counter Unit | R |
| CTR_INC | periph[3] | Counter Increment register | Counter Unit | W |
| ENG_CTRL | periph[4] | Control Register | [Global] | W |
| TRAP_CTRL | periph[5] | Trap Control Register | Trap Unit | W |
| CTR_DATA | periph[6] | Counter Data register | Counter Unit | W |
| PERIPH_CTRL | periph[7] | Peripheral Control register | [Global] | W |
| EXT_WR_DATA_I | periph[8] | External Memory Interface write data with ALU2 indexed addressing | External Memory Interface Unit | W |
| EXT_RD_DATA_I | periph[8] | External Memory Interface read data with ALU2 indexed addressing | External Memory Interface Unit | R |
| RESERVED | others | Reserved | | |

The format of the peripheral subunits are described in Appendix-A.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the claims below.

APPENDIX A

Peripheral Register Formats

| Field Name | Bits | Function |
|---|---|---|
| EXT_WR_DATA - External Memory Interface Write Data - Write Only | | |
| data | 39-0 | This value is written to the external memory interface write data bus. Writing this value also causes the interface chip select and write strobe to be asserted. The address presented to the external memory interface during the write is the concatenated value of Counter 3 (upper 20 bits) and Counter2 (lower 20 bits)). The instruction writing the memory interface does not stall due to a deasserted interface RDY signal; instead, this signal can be used as part of a branch/execute/trap condition to provide software-based wait states (during which other useful instructions may execute). The write value has not necessarily been accepted by the external memory until it asserts RDY. |
| EXT_WR_DATA_I - External Memory Interface Write Data with ALU2 Indexed Addressing - Write Only | | |
| data | 39-0 | This register functions equivalently to the EXT_WR_DATA register, except that the address presented to the external memory interface is Counter32 + the ALU2 result. |
| EXT_RD_DATA - External Memory Interface Read Data - Read Only | | |
| data | 39-0 | This value is read from the external memory interface read data bus. Reading this value also causes the interface chip select and read strobe to be asserted. The address presented to the external memory interface during the read is the concatenated value of Counter 3 (upper 20 bits) and Counter 2 (lower 20 bits) The instruction reading the memory interface does not stall due to a deasserted interface RDY signal; instead, this signal can be used as part of a branch/execute/trap condition to provide software-based wait states (during which other useful instructions may execute). The read value is not necessarily valid until the external memory asserts RDY. |
| EXT_RD_DATA_I - External Memory Interface Read Data with ALU2 Indexed Addressing - Read Only | | |
| data | 39-0 | This register functions equivalently to the EXT_RD_DATA register, except that the address presented to the external memory interface is Counter32 + the ALU2 result. |
| MAILBOX_W - Mailbox Register to Host - Write Only (Processor), Read Only (Host) | | |
| res | 39-32 | Reserved, write 0 |
| data | 31-0 | Mailbox register value. This value is writeable by the PicoEngine and readable by the host CPU for communication between the PicoEngine and host. The data contained in this register is application-dependent. |
| MAILBOX_R - Mailbox Register from Host - Read Only (Processor), Write Only (Host) | | |
| res | 39-32 | Reserved, write 0 |
| data | 31-0 | Mailbox register value. This value is readable by the PicoEngine and writeable by the host CPU for communication between the PicoEngine and host. The data contained in this register is application-dependent. |
| CTR_32 - Counter 32 Register - Read Only | | |
| counter3 | 39-20 | Value of counter 3, also used for external memory address high bits. |
| counter2 | 19-0 | Value of counter 2, also used for external memory address low bits. |
| CTR_INC - Counter Increment Register - Write Only | | |
| x | 39-0 | Writing this register increments any counter programmed to increment on a write to CTR_INC (as determined by the ctr*_inc_on_wr bits in the PERIPH_CTRL register). The value written is irrelevant. |
| CTR_DATA - Counter Data Register - Write Only | | |
| ctr_31 | 39-20 | This data is written to counters 3 and 1 when those counters are enabled by the corresponding ctr_wren bits in the PERIPH_CTRL register. |
| ctr_20 | 19-0 | This data is written to counters 2 and 0 when those counters are enabled by the corresponding ctr_wren bits in the PERIPH_CTRL register. |
| ENG_CTRL - Control Register - Write Only | | |
| res | 39-38 | Reserved, write 0 |
| reg_bank_ren | 37-36 | Register bank read enable. Selects which register bank will be read when a register (r[0] through r[15]) is used as a source in Data Compare or Data Modify instructions. Each bank includes 16 independent registers. Background-running instructions read from the bank that was active at the time the background-running instruction was issued. [Note: Engines currently only support Bank 0 unless specially configured during hardware synthesis. Ask PG if in doubt]. 11: Bank 3 10: Bank 2 01: Bank 1 00: Bank 0 |
| reg_bank_wen | 35-32 | Write enable bits for the four register banks. Selects which banks will be written when the Data Modify unit writes a register (r[0] through r[15]). Each bank includes 16 independent registers. More than one bank may be written simultaneously. [Note: Engines currently only support Bank 0 unless specially configured during hardware synthesis. Ask PG if in doubt]. 1xxx: Enable bank 3 for write; 0xxx: disable x1xx: Enable bank 2 for write; x0xx: disable xx1x: Enable bank 1 for write; xx0x: disable xxx1: Enable bank 0 for write; xxx0: disable |
| out1_en | 31 | Output bus 1 update enable. When this bit is 1, the output bus is in passthrough mode and passes data from its default source whenever the bus is not being written by a Data Modify instruction. When 0, the bus holds its previous value. |
| out0_en | 30 | Same as above, for output bus 0. |
| out1_src | 29 | Selects the default source for output bus 1. The data from this source is passed to the output bus whenever a Data Modify instruction isn't updating the bus, and the bus update enable (out1_en) is 1. The values for src are: 0: input bus 0 passthrough pipeline 1: input bus 1 passthrough pipeline The number of clocks of input to output delay is set by the p1_word_sel field. |
| out0_src | 28 | Same as above, for output bus 0. |
| p1_word_ | 27-24 | Word select for the in1 to output bus |

APPENDIX A-continued

Peripheral Register Formats

| Field Name | Bits | Function |
|---|---|---|
| sel | | passthrough pipeline. This gives the number of clocks (equal to p1_word_sel + 2) of delay between input bus 1 and the output bus in passthrough mode. An output bus is in passthrough mode whenever it isn't being updated by a DM instruction, and its out_en field is 1. |
| p0_word_sel | 23–20 | Same functionality as above, for the in0 to output bus passthrough pipeline. |
| flag_upd_cfg | 19 | DC instruction compare flag update control. Used in conjunction with the DC control field flag_update() to set the compare flag update mode as follows:<br>flag_upd_cfg  update  Update mode<br>0  0  SET<br>0  1  AND<br>1  0  OR<br>1  1  XOR |
| comp_mode | 18–14 | Selects the comparator mode (0 = equality, 1 = magnitude) for each DC comparator. In equality mode, the comparator result is 1 if (data & mask) == match, otherwise 0. In magnitude mode, the result is 1 if (data & mask) >= match, otherwise 0. [Magnitude mode issues and description] |
| pb_en | 13 | Enable for Data Compare input pipeline B. 0: disable pipeline (does not advance) 1: enable pipeline (advances 1 word per instruction) |
| pb_src | 12–8 | Source bus for Data Compare input pipeline B (one bit per input bus byte). 0: input bus 0 1: input bus 1 |
| res | 7–6 | Reserved, write 0 |
| pa_en | 5 | Enable for Data Compare input pipeline A. 0: disable pipeline (does not advance) 1: enable pipeline (advances 1 word per instruction) |
| pa_src | 4–0 | Source bus for Data Compare input pipeline A (one bit per input bus byte). 0: input bus 0 1: input bus 1 |

TRAP_CTRL—Trap Control Register—Write Only

| Field Name | Bits | Function |
|---|---|---|
| res | 39–32 | Reserved, write 0 |
| trap_relative | 31 | Trap relative address enable. When 1, trap_addr is treated as a sign-extended relative address from the current PC; a trap causes control to transfer to the PC + trap_addr. When 0, trap_addr is treated as an absolute address; a trap causes control to transfer to trap_addr. |
| trap_restore | 30 | Trap restore. When 1, enables restoring the state of the trap_en bit after a return from the trap routine. Otherwise, trap_en remains disabled after the return from the trap routine. |
| trap_en | 29 | Trap enable. enables traps when 1, disables them when 0. When the trap is enabled and its match/mask/tf condition is satisfied, control transfers to the target address specified by the trap_addr and trap_relative fields. Trap_en is cleared upon entry to the trap routine, thus disabling further traps. If trap_restore is set, the bit will be restored to its value before the trap upon return from the trap routine (which occurs via a branch to the saved PC). However, if software writes this bit before the trap routine returns, the bit written will be preserved upon the return. |
| trap_f | 28 | Trap on match/mask true/false. Determines whether trap should be taken if its match/mask condition is true (trap_f = 0) or false (trap_f = 1). |
| trap_match | 27–20 | Trap condition match bits. These bits specify the trap condition in the same manner as the branch/execute condition bits.<br>bits 27–26: match bits for external interrupts 1–0 respectively<br>bit 25: match bit for the Peripheral flag<br>bits 24–20: match bits for Data Compare flags 4–0 respectively |
| trap_mask | 19–12 | Trap condition mask bits. These bits specify the trap condition in the same manner as the branch/execute condition bits.<br>bits 19–18: mask bits for external interrupts 1–0 respectively<br>bit 17: mask bit for the Peripheral flag<br>bits 16–12: mask bits for Data Compare flags 4–0 respectively |
| res | 11–10 | Reserved, write 0 |
| trap_addr | 9–0 | Trap destination address. Holds the target address for traps. Control is transferred to trap_addr (if trap_relative = 0) or the current PC + trap_addr (if trap relative = 1) when traps are enabled and the trap match/mask/tf condition is satisfied. Indirect branching may be implemented by writing the target address to this field and trapping on an always-satisfied condition. |

PERIPH_CTRL—Peripheral Control Register—Write Only

| Field Name | Bits | Function |
|---|---|---|
| res | 39 | Reserved, write 0 |
| ct_f | 38 | Count on match/mask true/false. Determines whether counting should occur if the match/mask condition is true (ct_f = 0) or false (ct_f = 1). |
| ct_mask | 37–32 | Count enable condition mask bits. These bits specify the count condition (when count enable on match/mask/tf is configured by ctr*_ie_sel) in the same manner as the branch/execute condition bits.<br>bit 37: mask bit for the Peripheral flag<br>bits 36–32: mask bits for Data Compare flags 4–0 respectively |
| pf_en_hi | 31–30 | (See pf_en) |
| ct_match | 29–24 | Count enable condition match bits. These bits specify the count condition (when count enable on match/mask/tf is configured by ctr*_ie_sel) in the same manner as the branch/execute condition bits.<br>bit 29: match bit for the Peripheral flag<br>bits 28–24: match bits for Data Compare flags 4–0 respectively |
| ctr_wren | 23–20 | Counter write enables. These bits enable one or more of the counters for writing when the CTR_DATA register is written.<br>bit 23: 1 = enable write to counter 3, 0 = disable<br>bit 22: 1 = enable write to counter 2, 0 = disable<br>bit 21: 1 = enable write to counter 1, 0 = disable<br>bit 20: 1 = enable write to counter 0, 0 = disable |

APPENDIX A-continued

Peripheral Register Formats

| Field Name | Bits | Function |
|---|---|---|
| pf_en | 19–16 | Peripheral flag enable bits, used in combination with pf_en_hi. Selects the source(s) of the Peripheral flag (the P bit of the Flags register) used in branch, execute, trap, and count conditions. All sources with an enable bit of 1 are logically ANDed to generate the P bit; sources with an enable bit of 0 are ignored.<br>pf_en_hi, pf_en, source:<br>1x xxxx: Data Modify unit ALU3 carry flag<br>x1 xxxx: EXT_RDY (ready flag) signal from External Memory Interface<br>xx 1xxx: Counter 3 wrap flag; 1 when counter 3 wraps from 0xfffff to 0<br>xx x1xx: Counter 2 wrap flag; 1 when counter 2 wraps from 0xfffff to 0<br>xx xx1x: Counter 1 wrap flag; 1 when counter 1 wraps from 0xfffff to 0<br>xx xxx1: Counter 0 wrap flag; 1 when counter 0 wraps from 0xfffff to 0<br>Note: each counter wrap flag maintains its state until the counter is next updated, either by an increment or software write. Software writes to the CTR_DATA register reset the wrap flags of any counters written to. |
| ctr3_inc_on_wr | 15 | Counter 3 increment enable on peripheral register write. If this bit is 1, counter 3 will be incremented on any write to the CTR_INC register as well as any conditions generated due to the ctr3_ie_sel bits. If this bit is 0 or whenever CTR_INC is not written, counting is controlled by the ctr3_ie_sel bits. |
| ctr3_ie_sel | 14–12 | Counter 3 default increment enable bits. Selects the condition for incrementing counter 3.<br>111: increment when previous counter wraps (cascade with previous)<br>110: increment always<br>100: increment when counter mask/match/tf condition is satisfied<br>000: increment on external memory interface read or write (memory address autoincrement)<br>others: reserved |
| ctr2_inc_on_wr | 11 | Same functionality as ctr3_inc_on_wr, for counter 2. |
| ctr2_ie_sel | 10–8 | Same functionality as ctr3_ie_sel, for counter 2, with the following exception:<br>0111: don't increment |
| ctr1_inc_on_wr | 7 | Same functionality as ctr3_inc_on_wr, for counter 1. |
| ctr1_ie_sel | 6–4 | Same functionality as ctr3_ie_sel, for counter 1. |
| ctr0_inc_on_wr | 3 | Same functionality as ctr3_inc_on_wr, for counter 0. |
| ctr0_ie_sel | 2–0 | Same functionality as ctr3_ie_sel, for counter 0, with the following exception:<br>111: don't increment |

What is claimed is:

1. A processor synchronous with an instruction clock signal, comprising:

an execution control unit synchronous with the instruction clock signal and operable to execute an instruction per clock cycle of the instruction clock signal;

an input pipeline unit synchronous with the instruction clock signal and operable to receive a stream of input data words one data word per clock cycle of the instruction clock signal, the input pipeline unit further operable to selectively output one input data word per clock cycle of the instruction clock signal;

a data modify unit coupled to the input pipeline unit, the data modify unit operable to selectively modify input data words received from the input pipeline unit according to instruction-specified operators to generate modified data words one modified data word per clock cycle of the instruction clock signal;

a processor output selector operable to selectively output, at each clock cycle of the instruction clock signal, an instruction-specified one of the input data words and the modified data words; and wherein the execution control unit is operable to repeat execution of a current instruction having a background mode operator during a next clock cycle of the instruction clock signal.

2. The processor of claim 1, further comprising:

a data compare unit coupled to the input pipeline unit, the data compare unit operable to selectively compare input data words received from the input pipeline unit to instruction-specified operands to generate compare flags.

3. The processor of claim 2, wherein the execution control unit is operable to configure during each clock cycle of the instruction clock signal at least one of the data modify unit and the data compare unit according to a current instruction.

4. The processor of claim 3, wherein the execution control unit is operable to determine a next instruction to be processed according to compare flags generated by the data compare unit during a current clock cycle of the instruction clock signal and a branch operator specified in the current instruction.

5. The processor of claim 2, wherein the input pipeline unit comprises:

a plurality of successive stages each having an output, each respective stage operable to output a respective one of the input data words after a delay of a number of clock cycles of the instruction clock signal corresponding to a position of the respective stage in the input pipeline unit; and an output multiplexer coupled to at least a subset of the stages of the input pipeline unit, the output multiplexer operable to select for output to the data modifying unit and the data compare unit an instruction-specified one of the outputs from the subset of the stages of the input pipeline unit.

6. The processor of claim 2, further comprising:

a register bank accessible by the execution control unit, the data compare unit and the data modify unit, the register bank operable to store data for the execution control unit, the data compare unit and the data modify unit; and a peripheral unit accessible by the data modify unit, the peripheral unit for storing instruction-specified data therein.

7. The processor of claim 2, wherein the processor output selector comprises a multiplexer coupled to the input pipeline unit and the data modify unit to receive, respectively, the input data words and the modified data words.

8. The processor of claim 2, wherein the data modify unit comprises arithmetic logic units operable to perform instruction-specified operations on the input data words.

9. The processor of claim 1, wherein the execution control unit is operable to execute one instruction having at least two branch control operators during each clock cycle of the instruction clock signal.

10. The processor of claim 1, wherein the execution control unit is operable to execute one conditional instruction during each clock cycle of the instruction clock signal.

11. A processor synchronous with an instruction clock signal, the processor comprising:

an input pipeline unit operable to receive a plurality of input data words at a rate of one input data word per clock cycle of the instruction clock signal;

an execution control unit;

an instruction memory storing instructions for execution by the execution control unit, wherein the execution control unit is operable to execute, during each clock cycle of the instruction clock signal, one of the instructions so as to control an instruction-specified operation on an instruction-specified one of the input data words in the input pipeline unit, and wherein the execution control unit is operable to repeat execution of a current instruction having a background mode operator during next clock cycle of the instruction clock signal.

12. The processor of claim 11, further comprising:

a data modify unit coupled to the input pipeline unit, the data modify unit operable to selectively modify, during each clock cycle of the instruction clock signal, an input data word received from the input pipeline unit in accordance with an instruction specified operator, the data modify unit further operable to generate a modified output data word.

13. The processor of claim 12, further comprising:

a data compare unit coupled to the input pipeline unit, the data compare unit operable to selectively compare during each clock cycle of the instruction clock signal an input data word received from the input pipeline unit with an instruction specified operand and generating a resultant set of compare flags.

14. The processor of claim 13, wherein the execution control unit is operable to configure, during each clock cycle of the instruction clock signal, at least one of the data modify unit and the data compare unit in accordance with a current instruction.

15. The processor of claim 14, wherein the execution control unit is operable to determine a next instruction to be executed in accordance with the compare flags generated by the data compare unit in a current clock cycle of the instruction clock signal and a branch control operator in the current instruction.

16. The processor of claim 11, wherein the input pipeline unit comprises:

a plurality of successive stages each having an output, each respective stage outputting a respective one of the input data words after a delay of a number of clock cycles of the instruction clock signal corresponding to a position of the respective stage in the input pipeline unit; and an output multiplexer coupled to at least a subset of the stages of the input pipeline unit, the output multiplexer operable to select for output to the data modifying unit an instruction-specified one of the outputs from the subset of the stages of the input pipeline unit.

17. The processor of claim 12, further comprising a processor output selector coupled to the input pipeline unit and the data modify unit, the processor output selector operable to selectively output, at each clock cycle of the instruction clock signal, one of the input data words and the modified data words.

18. The processor of claim 13, further comprising:

a register bank accessible by the execution control unit, the data compare unit and the data modify unit, the register bank operable to store data for the execution control unit, the data compare unit and the data modify unit; and a peripheral unit accessible by the data modify unit, the peripheral unit for storing instruction-specified data therein.

19. The processor of claim 12, wherein the data modify unit comprises arithmetic logic units operable to perform instruction-specified operations on the input data words.

20. The processor of claim 11, wherein the execution control unit is operable to execute one instruction having at least two branch control operators during each clock cycle of the instruction clock signal.

21. The processor of claim 11, wherein the execution control unit is operable to execute one conditional instruction during each clock cycle of the instruction clock signal.

22. A processor synchronous with an instruction clock signal, comprising:

an input pipeline unit operable to continuously receive a stream of input data words including one data word during each clock cycle of the instruction clock signal, the input pipeline unit further operable to output successive ones of the data words during successive clock cycles of the instruction clock signal;

a data modify unit coupled to the input pipeline unit, said data modify unit operable to selectively modify during each clock cycle of the instruction clock signal an input data word received from the input pipeline unit in accordance with an instruction specified operator and generating a resultant output data word;

a data compare unit coupled to the input pipeline unit, said data compare unit operable to selectively compare during each clock cycle of the instruction clock signal an input data word received from the input pipeline unit with an instruction specified operand and generating a resultant set of compare flags; and an execution control unit, coupled to the data modify unit and data compare unit, the execution control unit operable to configure during each clock cycle of the instruction clock signal at least one of the data modify unit and the data compare unit in accordance with a current instruction, wherein the execution control unit is operable to repeating execution of a current instruction having a background mode operator during a next clock cycle of the instruction clock signal.

23. The processor of claim 22, wherein the execution control unit operable to determine a next instruction to be processed by the execution control unit in accordance with the compare flags generated during a current clock cycle of the instruction clock signal and a branch control operator in the current instruction.

24. The processor of claim 22, wherein the input pipeline unit comprises:

a plurality of successive stages each having an output, each respective stage operable to output a respective one of the input data words after a delay of a number of clock cycles of the instruction clock signal corresponding to a position of the respective stage in the input pipeline unit; and an output multiplexer coupled to at least a subset of the stages of the input pipeline unit, the output multiplexer operable to select for output to the data modifying unit an instruction-specified one of the outputs from the subset of the stages of the input pipeline unit.

25. The processor of claim 24, wherein the output multiplexer is operable to select for output to the data compare unit an instruction-specified one of the outputs from the subset of the stages of the input pipeline unit.

26. The processor of claim 22, wherein the input pipeline unit comprises:

first and second input pipelines, each pipeline having a plurality of successive stages each having an output, each respective stage operable to output a respective input data word of a first stream and a second stream of input data words after a delay of a number of clock cycles of the instruction clock signal corresponding to a position of the respective stage in the input pipeline unit;

a first output multiplexer coupled to at least a first subset of the stages of the first input pipeline, the first output multiplexer operable to select for output to the data modify unit an instruction-specified one of the outputs from the first subset of the stages of the first input pipeline; and a second output multiplexer coupled to at least a second subset of the stages of the second pipeline, the second output multiplexer operable to select for output to the data modify unit an instruction-specified one of the outputs from the second subset of the stages of the second input pipeline.

27. The processor of claim 26, further comprising:

a register bank accessible by the execution control unit, the data compare unit and the data modify unit, the register bank storing data for the execution control unit, the data compare unit and the data modify unit; and a peripheral unit accessible by the data modify unit, the peripheral unit for storing instruction-specified data therein.

28. The processor of claim 27, wherein the data modify unit comprises:

a first input multiplexer coupled to the first and second output multiplexers of the input pipeline unit, the register bank and ht peripheral unit, the first input multiplexer operable to selectively receive data from an instruction-specified one of the first and second output multiplexers, a memory location of the register bank and a memory location of the peripheral unit; and a second input multiplexer coupled to the first and second output multiplexers of the input pipeline unit, the register bank and the peripheral unit, the second input multiplexer operable to selectively receive data from an instruction-specified one of the first and second output multiplexers, a memory location of the register bank and a memory location of the peripheral unit.

29. The processor of claim 28, wherein the data modify unit comprises:

a first arithmetic logic unit coupled to the output of the first input multiplexer of the data modify unit, the first arithmetic logic unit selectively performing an instruction-specified operation on data provided by the first input multiplexer of the data modify unit; and a second arithmetic logic unit coupled the output of the second input multiplexer of the data modify unit, the second arithmetic logic unit selectively performing an instruction-specified operation on data provided by the second input multiplexer of the data modify unit.

30. The processor of claim 29, wherein the data modify unit comprises:

a third arithmetic logic unit coupled to the outputs of the first and second arithmetic logic units, the third arithmetic logic unit performing an instruction-specified operation on data provided by outputs of the first and second arithmetic logic units.

31. The processor of claim 30, wherein the input pipeline unit comprises:

first and second pass-through pipelines, each pipeline having a plurality of successive stages each having an output, each respective stage outputting a respective input data word of the first and second streams of input data words after a delay of a number of clock cycles of the instruction clock signal corresponding to a position of the respective stage in the input pipeline unit;

a third output multiplexer coupled to at least a third subset of the stages of the first pass-through pipeline, the third output multiplexer operable to select for output of the data modify unit an instruction-specified one of the outputs from the third subset of the stages of the first pass-through pipeline; and a fourth output multiplexer coupled at least a fourth subset of the stages of the second pass-through pipeline, the fourth output multiplexer operable to select for output to the data modify unit an instruction-specified one of the outputs from the fourth subset of the stages of the second pass-through pipeline.

32. The processor of claim 31, wherein the data modify unit comprises:

a first data modifying unit output multiplexer coupled to outputs of the first and third arithmetic logic units, and coupled to outputs of the third and fourth output multiplexers of the input pipeline unit, the first data modify unit output multiplexer operable to select for output an instruction-specified one of the outputs of the first and third arithmetic logic units and the outputs of the third and fourth output multiplexers of the input pipeline unit; and a second data modify unit output multiplexer coupled to outputs of the second and third arithmetic logic units, and coupled to outputs of the third and fourth output multiplexers of the input pipeline unit, the second data modify unit output multiplexer operable to select for output an instruction-specified one of the outputs of the second and third arithmetic logic units and the outputs of the third and fourth output multiplexers of the input pipeline unit.

33. The processor of claim 27, wherein the data compare unit comprises:

a plurality of source select and mask units, each source select and mask unit operable to select as mask operands instruction-specified ones of the outputs of the first and second output multiplexers of the input pipeline unit, an output of the register bank, an output of the peripheral unit, and an immediate data output of the execution control unit, each source select and mask unit generating a masked output;

each source select and mask unit operable to select as compare operands instruction-specified ones of the outputs of the first and second output multiplexers of the input pipeline unit, an output of the register bank, an output of the execution control unit and an immediate data output of the execution control unit, each source select and mask unit generating a compare output; and a plurality of comparators coupled to the outputs of the source select and mask units, the comparators generating compare results of comparing the masked outputs and the compare outputs of the source select and mask units.

34. The processor of claim 33, wherein the data compare unit comprises:

a plurality of flag update units coupled to the outputs of the comparators, the flag update units performing an instruction-specified logic operation on the compare results and a set of compare flags generated in a previous clock cycle of the instruction clock signal to generate the resultant compare flags.

35. The processor of claim 22, wherein the execution control unit is operable to executing one instruction having at least two branch control operators during each clock cycle of the instruction clock signal.

36. The processor of claim 22, wherein the execution control unit is operable to executing one conditional instruction during each clock cycle of the instruction clock signal.

* * * * *

UNITED STATES PATENT AND TRADEMARK OFFICE
CERTIFICATE OF CORRECTION

PATENT NO.       : 6,880,070 B2
APPLICATION NO.  : 09/976765
DATED            : April 12, 2005
INVENTOR(S)      : Gentieu et al.

It is certified that error appears in the above-identified patent and that said Letters Patent is hereby corrected as shown below:

Figure 2B
Change both instances of the numeral "224" to --214--, as shown attached sheet 3 of 9.

Column 5
Line 40, before "invention" insert --the--

Column 6
Line 7, change "instructions" to --instruction--
Line 57, change "multiplexes" to --multiplexers--
Line 57, change "includes" to --include--

Column 8
Line 49, change "processor" to –processors--
Line 54, before "inbound" change "a" to --an--
Line 67, change "use" to --uses--

Column 15
Line 18, change "A>=0" to --A==0--
Line 21, change "A==0" to --A>=0--

Column 27
Line 43, change "ht" to --the--

Signed and Sealed this

Seventh Day of August, 2007

JON W. DUDAS
*Director of the United States Patent and Trademark Office*